(12) United States Patent
Kennedy et al.

(10) Patent No.: US 7,797,433 B2
(45) Date of Patent: Sep. 14, 2010

(54) SYSTEM, METHOD, AND COMPUTER PROGRAM PRODUCT FOR RESOLVING ADDRESSING IN A NETWORK INCLUDING A NETWORK ADDRESS TRANSLATOR

(75) Inventors: Thomas Scott Kennedy, Eatontown, NJ (US); Jeffrey S. Skelton, Perrineville, NJ (US); Estie Galinsky, Lakewood, NJ (US); Alan Staniforth, East Brunswick, NJ (US); Harold Jeffrey Goldberg, Lakewood, NJ (US)

(73) Assignee: Net2Phone, Newark, NJ (US)

( * ) Notice: Subject to any disclaimer, the term of this patent is extended or adjusted under 35 U.S.C. 154(b) by 1821 days.

(21) Appl. No.: 10/311,324

(22) PCT Filed: Jun. 29, 2001

(86) PCT No.: PCT/US01/16512

§ 371 (c)(1),
(2), (4) Date: Sep. 29, 2003

(87) PCT Pub. No.: WO02/03217

PCT Pub. Date: Jan. 10, 2002

(65) Prior Publication Data

US 2004/0252683 A1 Dec. 16, 2004

Related U.S. Application Data

(60) Provisional application No. 60/215,872, filed on Jun. 30, 2000.

(51) Int. Cl.
*G06F 15/16* (2006.01)
(52) U.S. Cl. .................. 709/229; 709/224; 709/227; 709/228; 709/245

(58) Field of Classification Search ......... 709/223–229, 709/245; 370/389, 352
See application file for complete search history.

(56) References Cited

U.S. PATENT DOCUMENTS

| | | | |
|---|---|---|---|
| 5,793,763 | A | 8/1998 | Mayes et al. |
| 5,999,965 | A | 12/1999 | Kelly |
| 6,009,469 | A | 12/1999 | Mattaway et al. |
| 6,047,292 | A | 4/2000 | Kelly et al. |
| 6,055,236 | A | 4/2000 | Nessett et al. |

(Continued)

OTHER PUBLICATIONS

C. Yang, "INETPhone: Telephone Services and Servers on Internet", Request for Comments 1789, pp. 1-6, Apr. 1995.

(Continued)

*Primary Examiner*—Shawki S Ismail
(74) *Attorney, Agent, or Firm*—Davidson Berquist Jackson & Gowdey LLP

(57) ABSTRACT

A system, method, and computer program product through which address resolution is performed for nodes (101, 103) of a network that are behind a network address translator (NAT). A determination is made upon the initiation of a communication session as to whether one or more of the nodes (101, 103) included in the session are behind a NAT. Based on the determination, information is exchanged (L102, L103) from an independent application server (105) to the nodes (101, 103) included in the session so as to resolve the addressing problems introduced by the NAT. The invention is applicable in applications including, but not limited to, IP telephony, and applications complying with the session initiation protocol (SIP).

12 Claims, 16 Drawing Sheets

U.S. PATENT DOCUMENTS

| | | | |
|---|---|---|---|
| 6,058,431 | A | 5/2000 | Srisuresh et al. |
| 6,128,664 | A | 10/2000 | Yanagidate et al. |
| 6,131,121 | A | 10/2000 | Mattaway et al. |
| 6,178,453 | B1 | 1/2001 | Mattaway et al. |
| 6,185,184 | B1 | 2/2001 | Mattaway et al. |
| 6,226,678 | B1 | 5/2001 | Mattaway et al. |
| 6,275,490 | B1 | 8/2001 | Mattaway et al. |
| 6,347,085 | B2 | 2/2002 | Kelly |
| 6,377,568 | B1 | 4/2002 | Kelly |
| 6,463,565 | B1 | 10/2002 | Kelly |
| 6,594,254 | B1 | 7/2003 | Kelly |
| 6,687,738 | B1 | 2/2004 | Hutton |
| 6,701,365 | B1 | 3/2004 | Hutton |
| 6,728,784 | B1 | 4/2004 | Mattaway |
| 6,781,982 | B1 * | 8/2004 | Borella et al. ............... 370/352 |
| 6,822,957 | B1 * | 11/2004 | Schuster et al. ............. 370/389 |
| 6,829,645 | B1 | 12/2004 | Hutton |
| 6,981,035 | B1 | 12/2005 | Goldberg et al. |
| 7,032,242 | B1 * | 4/2006 | Grabelsky et al. ............. 726/11 |
| 7,068,646 | B2 | 6/2006 | Fangman et al. |
| 7,313,145 | B1 * | 12/2007 | Bradd et al. ................ 370/401 |
| 7,424,033 | B2 * | 9/2008 | Kwak ........................ 370/466 |
| 2001/0040885 | A1 | 11/2001 | Jonas et al. |
| 2002/0064147 | A1 | 5/2002 | Jonas et al. |
| 2003/0018814 | A1 * | 1/2003 | Kao et al. .................... 709/245 |
| 2003/0193933 | A1 | 10/2003 | Jonas et al. |
| 2005/0044247 | A1 * | 2/2005 | Bar-Zakai ................... 709/229 |
| 2005/0050211 | A1 * | 3/2005 | Kaul et al. .................. 709/229 |

OTHER PUBLICATIONS

RFC 1631: The IP Network Address Translator (NAT), May 1994.
RFC 1889: RTP: A Transport Protocol for Real-Time Applications, Jan. 1996.
RFC 2205: Resource ReSerVation Protocol (RSVP)—Version 1 Functional Specification, Sep. 1997.
RFC 2326: Real Time Streaming Protocol (RTSP), Apr. 1998 (scanned part1).
RFC 2326: Real Time Streaming Protocol (RTSP), Apr. 1998 (scanned part2).
RFC 2327: SDP: Session Description Protocol, Apr. 1998.
RFC 2974: Session Announcement Protocol, Oct. 2000.

* cited by examiner

SYSTEM, METHOD, AND COMPUTER PROGRAM PRODUCT FOR RESOLVING ADDRESSING IN A NETWORK INCLUDING A NETWORK ADDRESS TRANSLATOR

CROSS-REFERENCE TO RELATED PATENT DOCUMENTS

The present document claims the benefit of the earlier filing date of commonly owned, co-pending U.S. provisional patent application Ser. No. 60/215,872, entitled "INTERNET MESSAGING USING ADDRESS TRANSLATIONS," filed in the United States Patent and Trademark Office on Jun. 30, 2000, the entire contents of which is incorporated herein by reference.

BACKGROUND OF THE INVENTION

1. Field of the Invention

The present invention relates to Internet messaging. More particularly, the present invention relates to systems, methods, and computer program products for resolving addressing in networks that include a network address translator.

2. Discussion of the Background

The transmission control protocol/Internet protocol (TCP/IP) suite includes four layers, a link layer, a network layer, a transport layer, and an application layer. A detailed explanation of the TCP/IP protocol suite is provided in Stevens, W., "TCP/IP Illustrated, Vol. 1, The Protocols," Addison-Wesley Publishing Co., $15^{th}$ printing, October 1999, ISBN: 0-201-63346-9, and Loshin, P., "TCP/IP Clearly Explained," Morgan-Kaufmann, $3^{rd}$ Ed., 1999, ISBN: 0-12455826-7, the entire contents of both of which are incorporated herein by reference.

The IP protocol is a network layer protocol for providing an unreliable, connectionless datagram delivery service. TCP and the user datagram protocol (UDP) are transport layer protocols for providing a flow of data between two hosts in a TCP/IP network. TCP provides a reliable connection-based flow of data between two hosts, while UDP provides a simpler, less reliable flow of data between two hosts.

TCP/IP is a packet-based protocol in which packets of information are transported from node to node. Accordingly, each node in a TCP/IP network must have an address that is unique within that network in order to receive those packets that are sent to that node. The TCP, UDP, and IP protocols all include adding header information to packets of information. These headers include the address information of both the source node sending the packet, and the destination node which is the intended recipient of the packet. The IP header includes the source and destination IP addresses, while the UDP header or TCP header include the source and destination port numbers through which the packets are to be communicated.

IP addresses are 32 bits. IP addresses are normally represented in "dotted decimal" format. For example, IP network addresses may be represented as including the range of addresses from 0.0.0.0 to 255.255.255.255.

The Internet is a TCP/IP-based network that includes many other TCP/IP networks. An overview of the Internet is provided in Gralla, P., "How the Internet Works," Que, Millennium Ed., August 1999, ISBN: 0-7897-2132-5, the entire contents of which is incorporated herein by reference. The phenomenal growth of the Internet has given rise to a concern within the Internet community that the current TCP/IP protocol suite will be unable to accommodate the number of nodes on the Internet. In other words, the 32-bit IP address provided in the TCP/IP protocol may be insufficient. As a short-term solution, the idea of a network address translator (NAT) has been developed by the Internet engineering taskforce (IETF). The IP NAT is described in RFC 1631, available through the IETF website (www.ietf.org). The entire contents RFC 1631 is herein by reference. As described in RFC 1631, the IP NAT is placed at a border between the Internet and another network. By using a NAT, an entire network can share, for example, a single Internet address, through which all external communications will be routed. The NAT simply maintains a translation table that translates packets of information between the individual nodes of the local network, and the common Internet address of the network. By using a NAT, a single Internet address may be shared by an entire network, thereby minimizing the address depletion problem confronting the Internet.

One recognized limitation of a NAT is that the source address included in the IP header of all packets originating from the NAT, and by extension, any of the nodes of the network behind the NAT, is the same. This limitation will impact those applications that rely on knowing their unique Internet address. While each node of the network behind the NAT has a unique IP address for that network, that IP address is not necessarily a globally-unique Internet IP address. Only the IP address of the NAT is guaranteed to be a globally unique IP address.

SUMMARY OF THE INVENTION

The inventors of the present invention have recognized that for Internet-based services, for example, IP telephony (also known as voice-over-IP (VOIP)), text chat, and video chat, if one or more of the nodes of the session are behind a network address translator (NAT), that fluid communications between two nodes becomes difficult, if not impossible. Accordingly, one object of the present invention is to provide a solution to this problem, as well as other problems and deficiencies associated with address resolution in networks including NATs.

The inventors of the present invention have further recognized that, for applications such as IP telephony, routing media packets through a server on the public network in order to perform network address translation, is an unacceptable approach since an additional delay would be introduced, which could result in an unacceptable voice delay or even fragmented speech. Accordingly, a further object of the present invention is to provide a protocol through which nodes behind a NAT can communicate with time-critical information with other nodes, which may themselves be behind a NAT.

The inventors of the present invention have further recognized that it would be advantageous if an address resolution protocol was protocol independent such that a client would need only distinguish address resolution packets from media packets in order to take advantage of the address resolution protocol. Furthermore, the present inventors recognized that by performing third party address resolution, several advantages may be achieved. For example, if the third party retains the address resolution information, the third party will be able to efficiently manage a transfer of, for example, a voice-over-IP call without the need to re-invoke the address resolution protocol. A security advantage to performing address resolution through a third party, as recognized by the present inventors, is that it becomes more difficult to "steal" a media session as compared to an approach where the clients simply send packets back to where they came from.

The above-described and other objects are addressed by the present invention, which includes a novel computer-based system, method, and computer program product through which address resolution is performed for nodes that are behind a NAT. A determination is made upon the initiation of a communication session as to whether one or more of the nodes included in the session are behind a NAT. Based on the determination, information is exchanged from an independent application server to the nodes included in the session so as to resolve the addressing problems introduced by the NAT. The invention is applicable in applications including, but not limited to, IP telephony, and applications complying with the session initiation protocol (SIP).

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS."

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
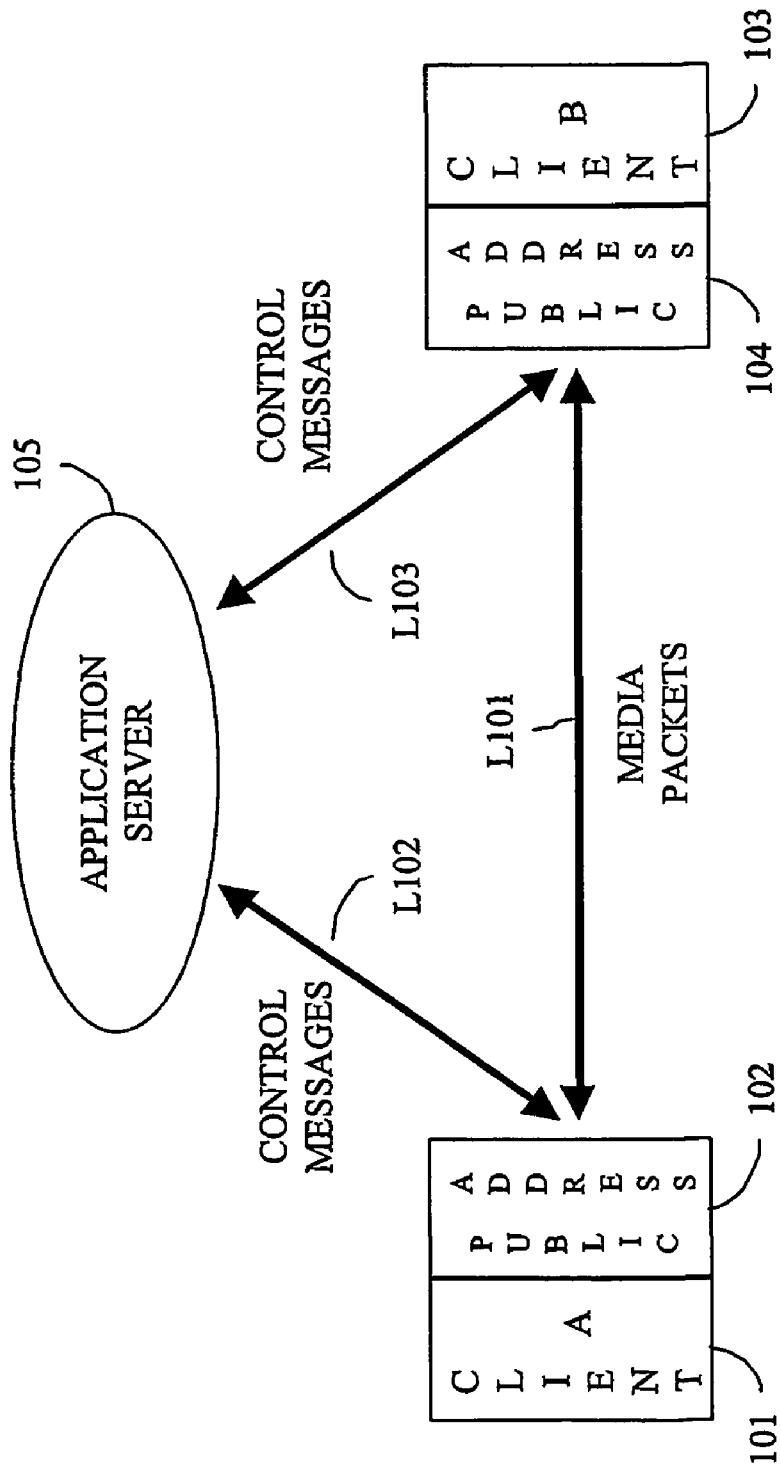
FIG. 1 is a block diagram illustrating a scenario in which neither of the clients involved in a session is behind a NAT.

Referring now to the figures, wherein like reference numerals designate identical or corresponding parts throughout the several views, and more particularly to FIG. 1, which is a block diagram of a system in which two client nodes are communicating with one another through an application controlled by a separate server.

As shown in FIG. 1, the system includes a first client, client A 101, and a second client, client B 103. Client A 101 and client B 103 both represent nodes on a network, for example, the Internet. Client A 101 has a public address 102 on the network, and client B 103 has a public address 104 on the same network. Client A 101 may communicate with client B 103 through a link L101 as controlled by the application server 105. The application server 105 provides the control for a particular application, such as an IP telephony application. The application server communicates with client A 101 through a link L102, and the application server 105 communicates with client B 103 through a different link L103. The application server 105 coordinates the establishment of the link L101 between client A 101 and client B 103. Once the link L101 is established, media packets may be exchanged in a communication session between client A 101 and client B 103.

Figure 2:
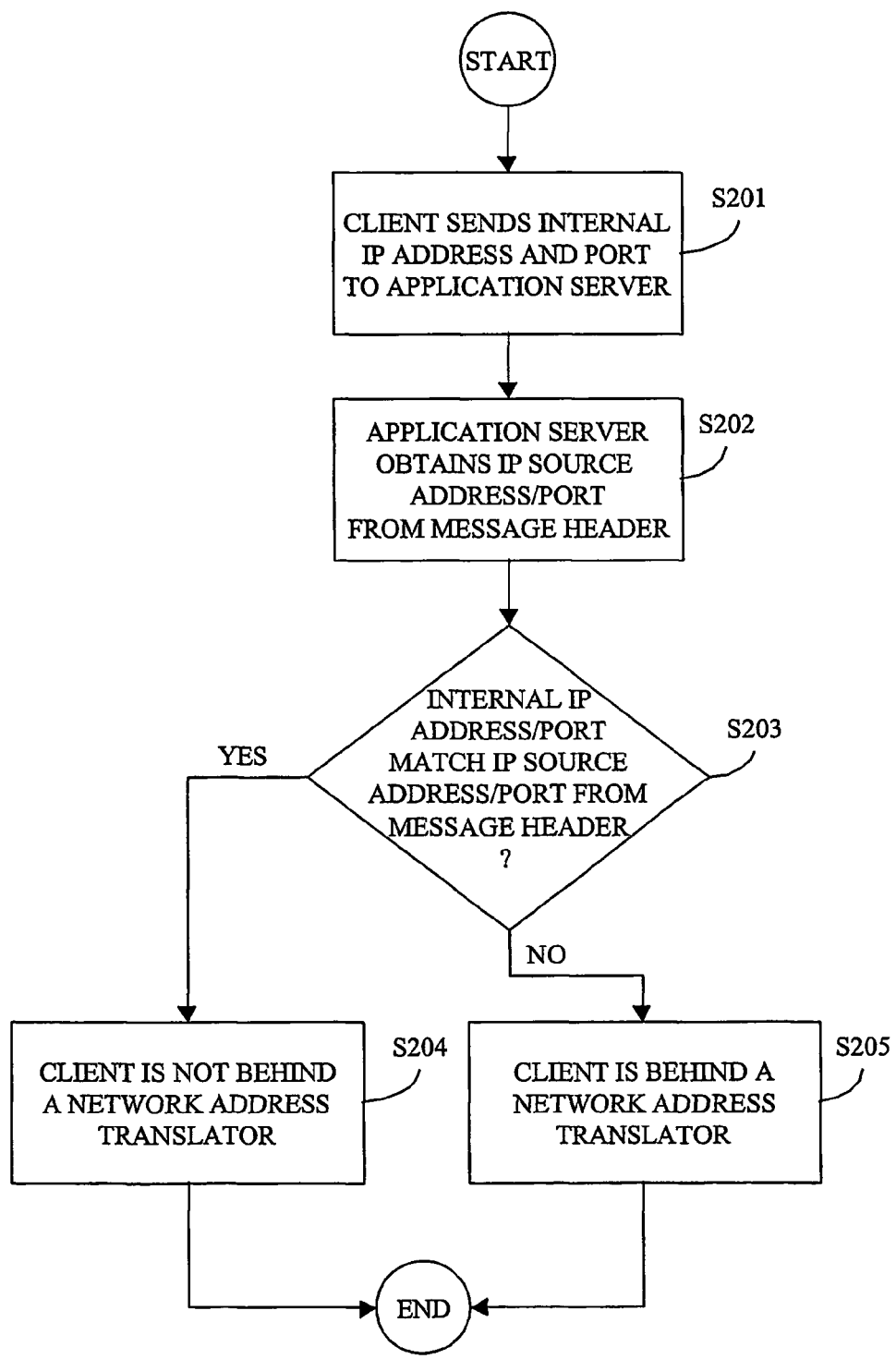
FIG. 2 is a flow diagram of a process for determining whether a client is behind a network address translator (NAT) according to one embodiment of the present invention.

FIG. 2 is a flow diagram illustrating a process through which an application server 105 determines whether client A 101 and/or client B 103 are behind a network address translator (NAT). As shown in FIG. 2, the process begins at step S201 where a client 101, 103 sends their internal IP address and port to the application server 105. The process then proceeds to step S202 where the application server 105 obtains the IP source address and port from the header of the message sent by the client 101, 103 to the application server 105. The IP source address and port are automatically populated in compliance with the TCP/IP protocol by the node transmitting the packet. The process then proceeds to step S203 where the application server 105 determines whether the internal IP address and port sent by the client 101, 103 matches the IP source address and port that the application server 105 extracted from the header of the message originated by the client 101, 103. If it is determined that the internal IP address and port matches the IP source address and port from the message header (i.e., "Yes" at step S203), the process proceeds to step S204 where a determination is made that the client 101, 103 sending the message to the application server 105 is not behind a network address translator. Once this determination is made at step 204 the process ends.

If, on the other hand, the application server 105 determines that the internal IP address and port does not match the source address and port extracted from the header of the message sent by the client 101, 103 (i.e., "No" at step S203), the process proceeds to step S205 where the application server 105 makes a determination that the client 101, 103 is behind a network address translator. Once the application server 105 has made this determination at step S205, the process ends.

In one embodiment of the present invention each of the clients 101, 103 participating in a communication session under the control of the application server 105 reports their internal IP address to the application server 105. Based on this information, the application server 105 is able to perform the processing described in FIG. 2 to determine which, if any, of the nodes involved in a particular session are behind a NAT.

In one embodiment of the present invention, clients periodically send packets out in order to prevent the external IP address and UDP port assigned to a particular client from being reassigned. The frequency of these "silence packets" depends on the particular NAT that the client is behind, but typically, by sending a "silence packet" every 1 to 10 seconds is sufficient to keep the connection active. As would be understood by one of ordinary skill in the art, if a connection were dropped, it is unlikely that a translation established for a new connection would be the same as the translation for the dropped connection.

Figure 3:
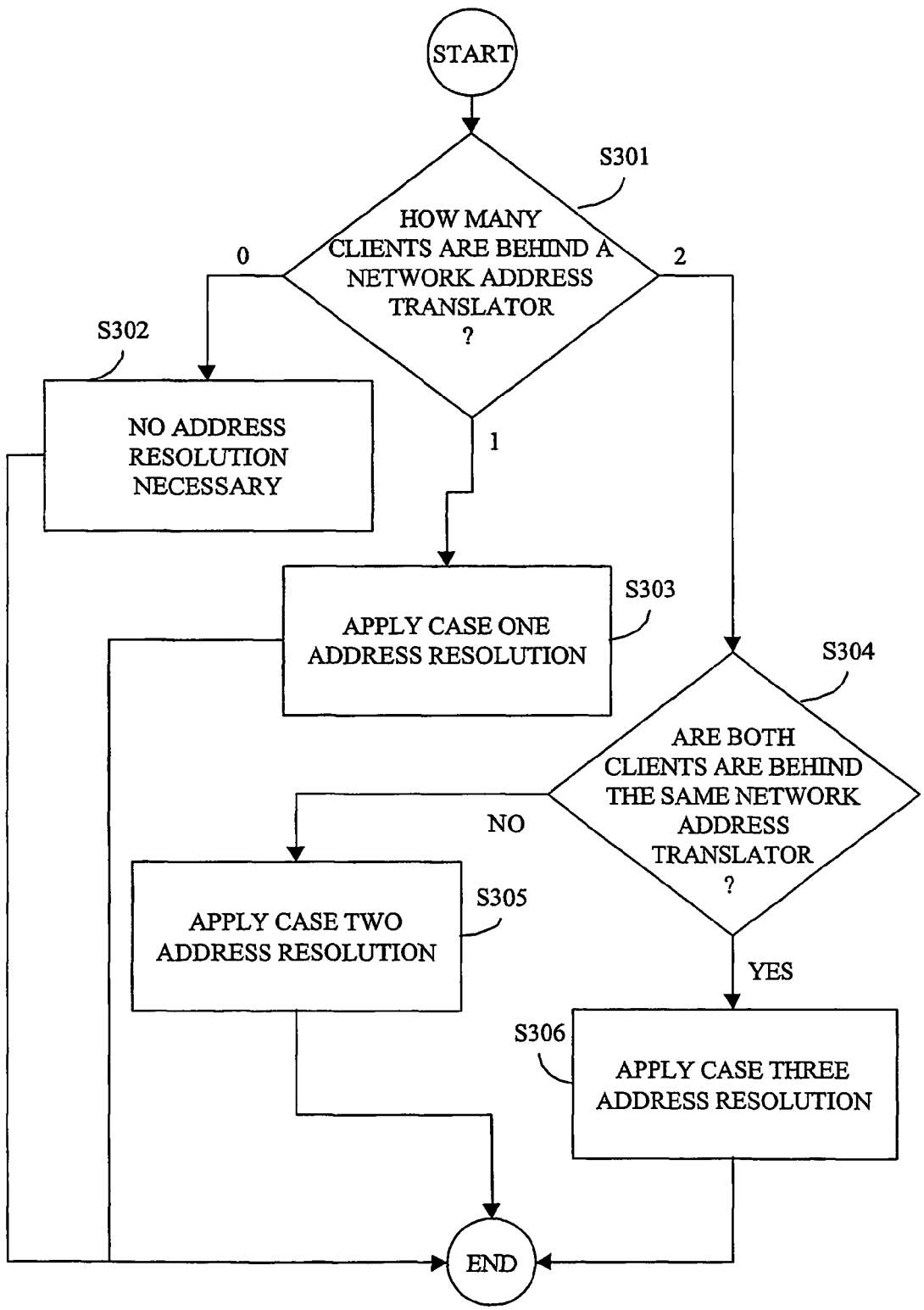
FIG. 3 is a flow diagram of a process for determining an applicable case for performing address resolution for a given session according to one embodiment of the present invention.

FIG. 3 is a flow diagram illustrating a process through which the application server 105 determines which address resolution scenario applies for a particular session according to one embodiment of the present invention. As shown in FIG. 3, the process begins at step S301 where the application server 105 makes a determination as to how many of the clients 101, 103 involved in a particular session are behind a network address translator. If it is determined that none of the clients 101, 103 are behind a NAT (i.e., "0" at step S301), the process proceeds to step S302 where the application server 105 makes a determination that no address resolution is necessary in order for the clients 101, 103 to communicate. Once this determination is made at step S302, the process ends. In this scenario, client A 101 and client B 103 can communicate through their respective public addresses 102, 104.

If it is determined that one of the clients 101, 103 is behind a NAT, but the other client 101, 103 is not behind a NAT (i.e., "1" at step S301), the process proceeds to step S303 where the application server 105 makes a determination to apply case 1 address resolution. Once this determination is made at step S303, the process ends.

If, on the other hand, it is determined that both clients 101, 103 are behind a NAT (i.e., "2" at step S301), the process proceeds to step S304 where the application server 105 makes a determination as to whether both clients 101, 103 are behind the same NAT. If it is determined at step S304 that both clients 101, 103 are not behind the same NAT (i.e., "No" at step S304), the process proceeds to step S305 where the application server 105 makes a determination to apply case 2 address resolution. Once this determination is made at step S305, the process ends. If, on the other hand, it is determined that both clients 101, 103 are behind the same NAT (i.e., "Yes" at step S304), the process proceeds to step S306 where the application server 105 makes a determination to apply case 3 address resolution. Once this determination is made at step S306, the process ends.

Figure 4:
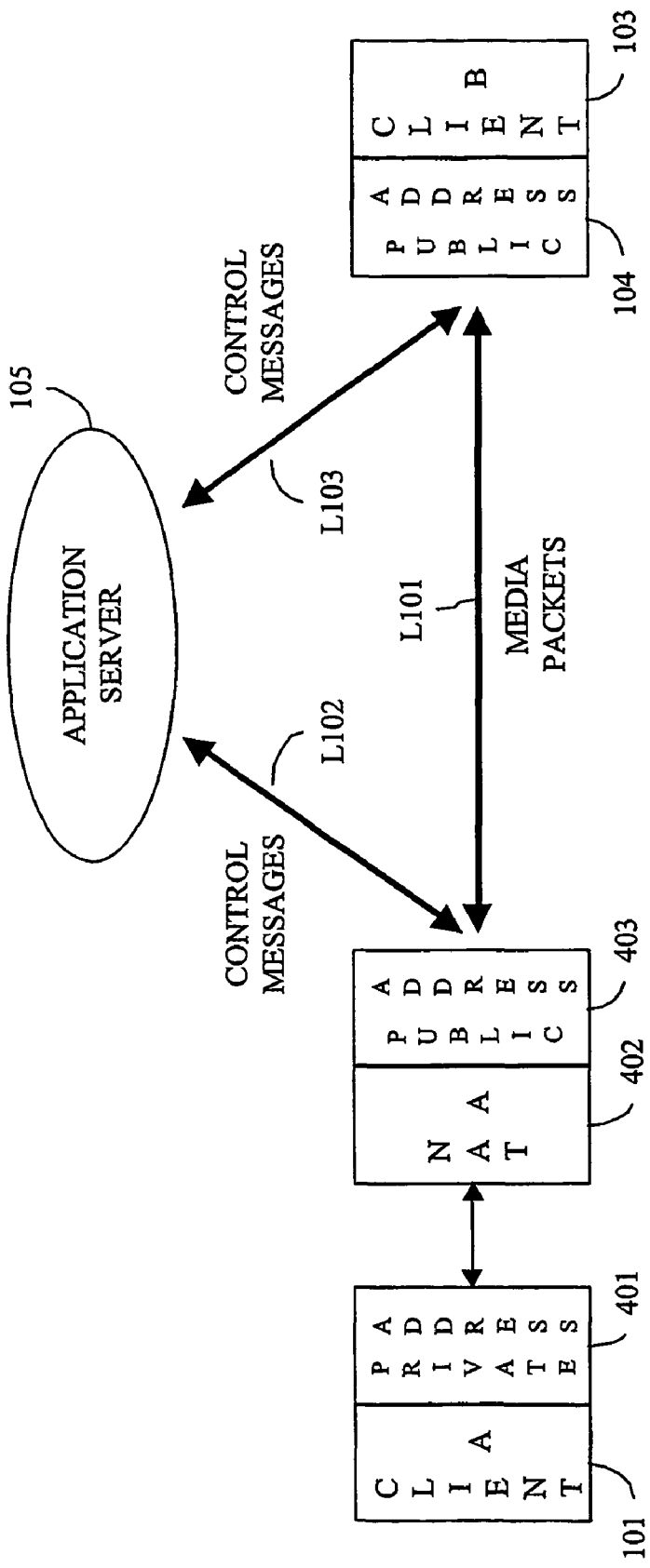
FIG. 4 is a block diagram illustrating a scenario in which one of two nodes of a session is behind a NAT.

FIG. 4 is a block diagram of a system illustrating an example where case 1 address resolution, as described in the context of the flow diagram of FIG. 3, would be applied. As shown in FIG. 4, client A 101 is behind a NAT 402. Client B 103, on the other hand, is not behind a NAT. In this scenario, client A 101 has a private address 401, which is a unique address for an internal network behind NAT A 402. In this example, all of the nodes of the network behind NAT A 402 share a single public address 403. As messages are sent by client A 101 to nodes on the public network, for example, client B 103, the source address included in the header of the packets of information will reflect the public address 403, not the private address 401. As multiple clients behind NAT A 402 communicate with the public network, the source of their respective packets of information will not be distinguishable by the source IP address included in the IP header of those packets. Accordingly, in the situation illustrated in FIG. 4, while client A 101 will be able to communicate directly to client B 103 since client B 103 has only a single, globally-unique public address 104, the same is not true with respect to client B's 103 ability to communicate with client A 101. Because client A 101 shares a single public address 403 with each of the nodes connected to the network behind NAT A 402, client B 103 will be unable to determine a globally-unique address for client A 101 by the source IP address included in packets received by client B 103 from client A 101.

Figure 5:
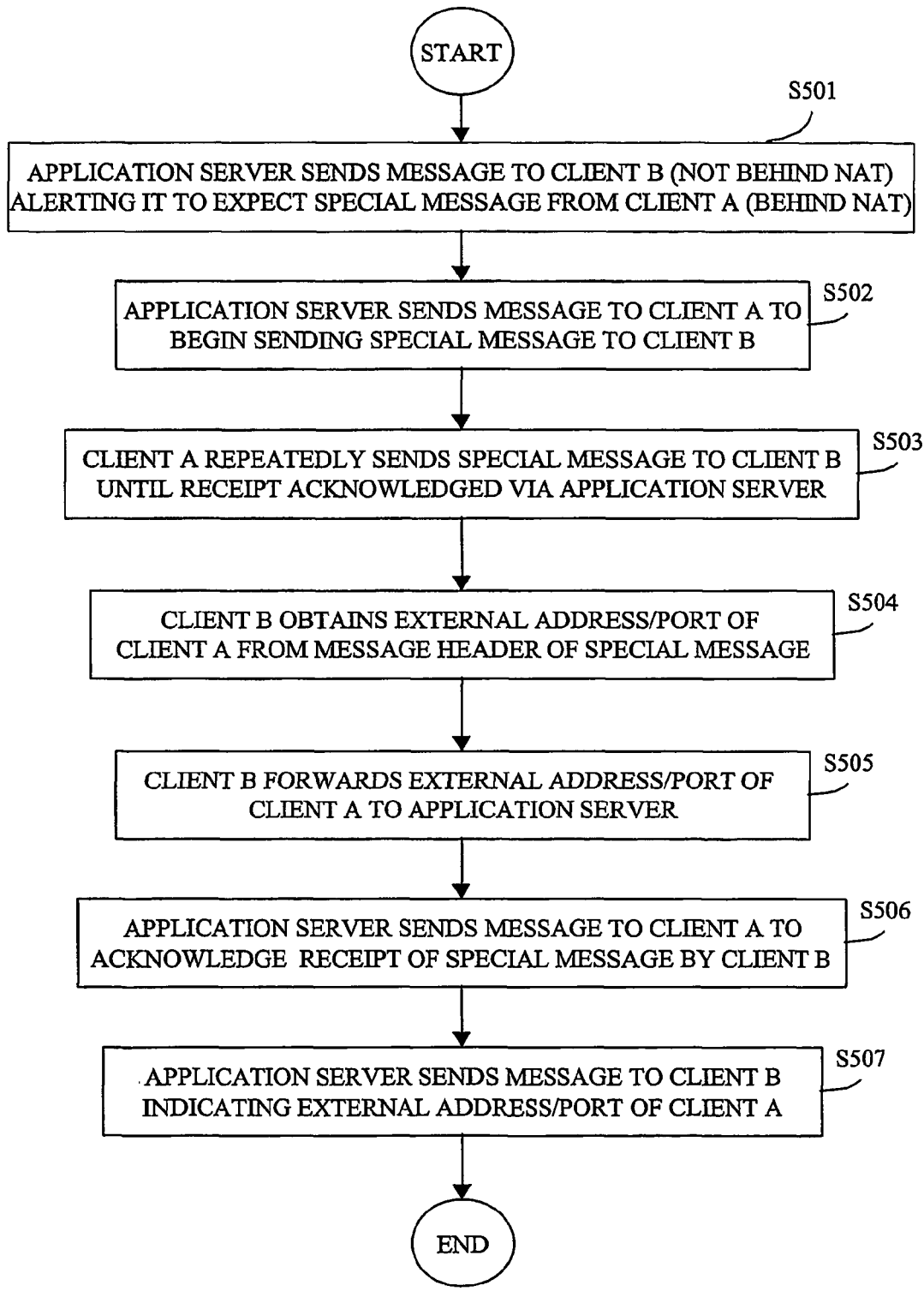
FIG. 5 is a flow diagram illustrating a process for performing address resolution is performed in a scenario such as that illustrated in FIG. 4 according to one embodiment of the present invention.

FIG. 5 is a flow diagram describing a process through which address resolution is performed in a situation such as that shown in FIG. 4 according to one embodiment of the present invention. As described above, the scenario where only one of the two clients 101, 103 is behind a NAT 402, will be referred to as a case 1 situation. As shown in FIG. 5, the process begins at step S501 where the application server 105 sends a message to client B 103 alerting it to expect a special message sent to it from client A 101 which is behind NAT A 402. The process then proceeds to step S502 where the application server 105 sends a message to client A 101 to begin sending the special message to client B 103. The process then proceeds to step S503 where client A 101 repeatedly sends the special message to client B 103 until receipt of that special message by client B 103 is acknowledged to client A 101 via the application server 105.

Once client B 103 receives the special message from client A 101, client B 103 will obtain the external address and port of client A 101 from the message header of the special message. As discussed above, this external address and port of client A 101 will correspond not to the private address 401 of client A 101, but rather, to the public address 403 of NAT A 402, and the particular port of NAT A 402 being accessed by client A 101 for sending the special message. Once client B 103 has obtained this information, the process proceeds to step S505 where client B 103 forwards the external address and port of client A 101 (i.e., the public address of NAT A 402) to the application server 105. The process then proceeds to step S506 where the application server 105 sends a message to client A 101 acknowledging receipt of the special message by client B 103. The process then proceeds to step S507 where the application server 105 sends a message to client B 103 indicating which external address and port of client A 101 should be addressed by client B 103 in order to communicate to client A 101 through NAT A 402. Once client B 103 has been told which address and port of NAT A 402 through which to communicate, the process ends.

In one embodiment of the present invention, control messages sent between the application server 105 and the clients 101, 103 comply with the transmission control protocol/Internet protocol (TCP/IP), while the special message sent from one client (e.g., client A 101) to another client (e.g., client B 103), as well as the messages sent during the communication session between the clients following the address resolution processing, comply with the user datagram protocol (UDP).

Figure 6:
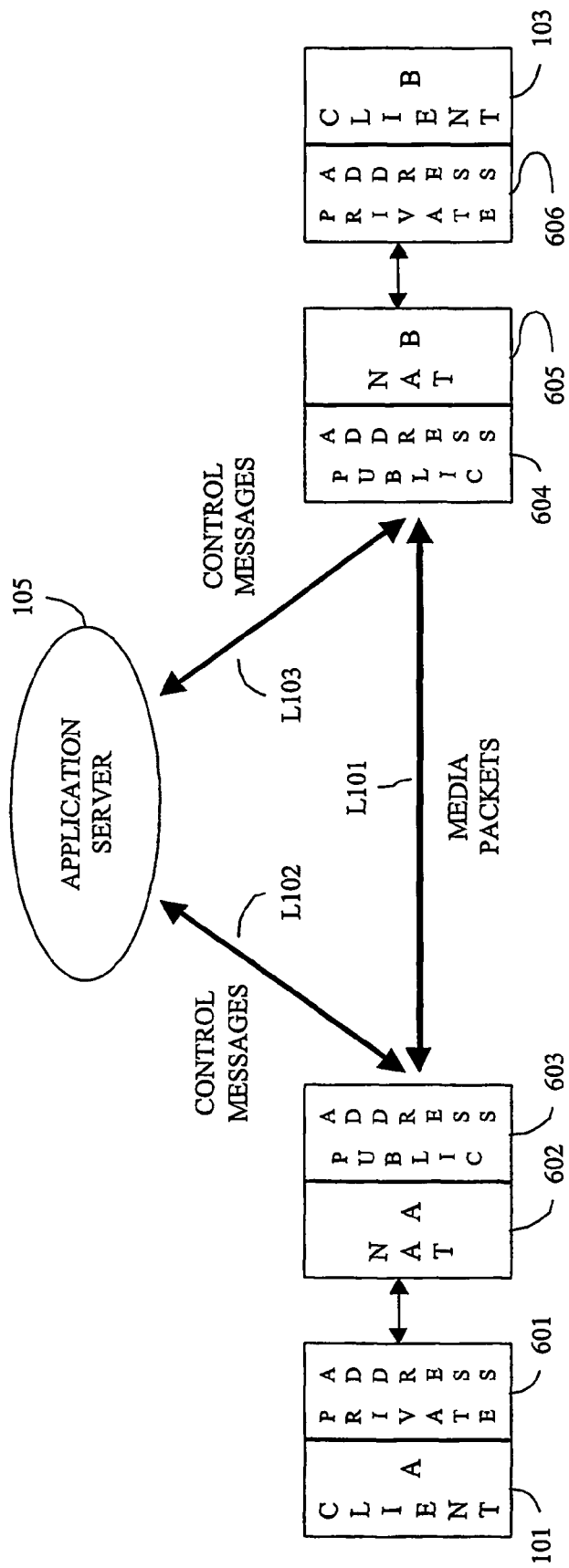
FIG. 6 is a block diagram illustrating a scenario in which each of the clients of a session are behind a different NAT.

FIG. 6 is a block diagram of a system illustrating a scenario described in the context of flow diagram FIG. 3 as one in which case 2 address resolution applies. As shown in FIG. 6, client A 101 is behind NAT A 602, while client B 103 is behind NAT B 605, which is a different NAT than NAT A 602. Because client A 101 and client B 103 are behind different NATs 602, 605, client A 101 is unable to determine a globally-unique address for client B 103, and client B 103 is unable to determine a globally-unique address for client A 101. Client A 101 is known to the public network as the public address 603 of NAT A 602. Client B 103 is known to the public network as the public address 604 of NAT B 605.

Figure 7A:
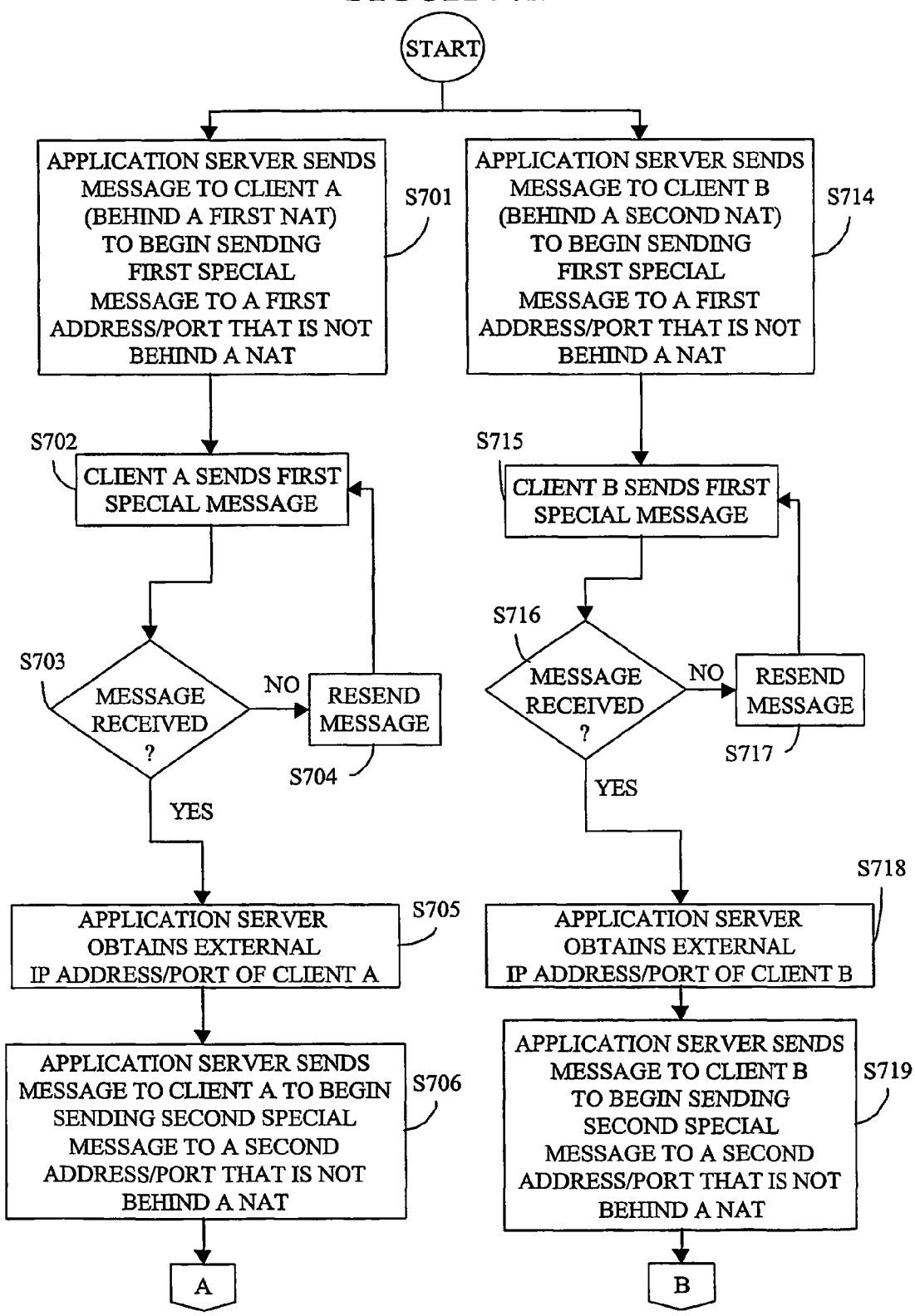
FIGS. 7A-7C are a flow diagram illustrating a process through which address resolution is performed in a scenario such as that illustrated in FIG. 6 according to one embodiment of the present invention.
Figure 7B:
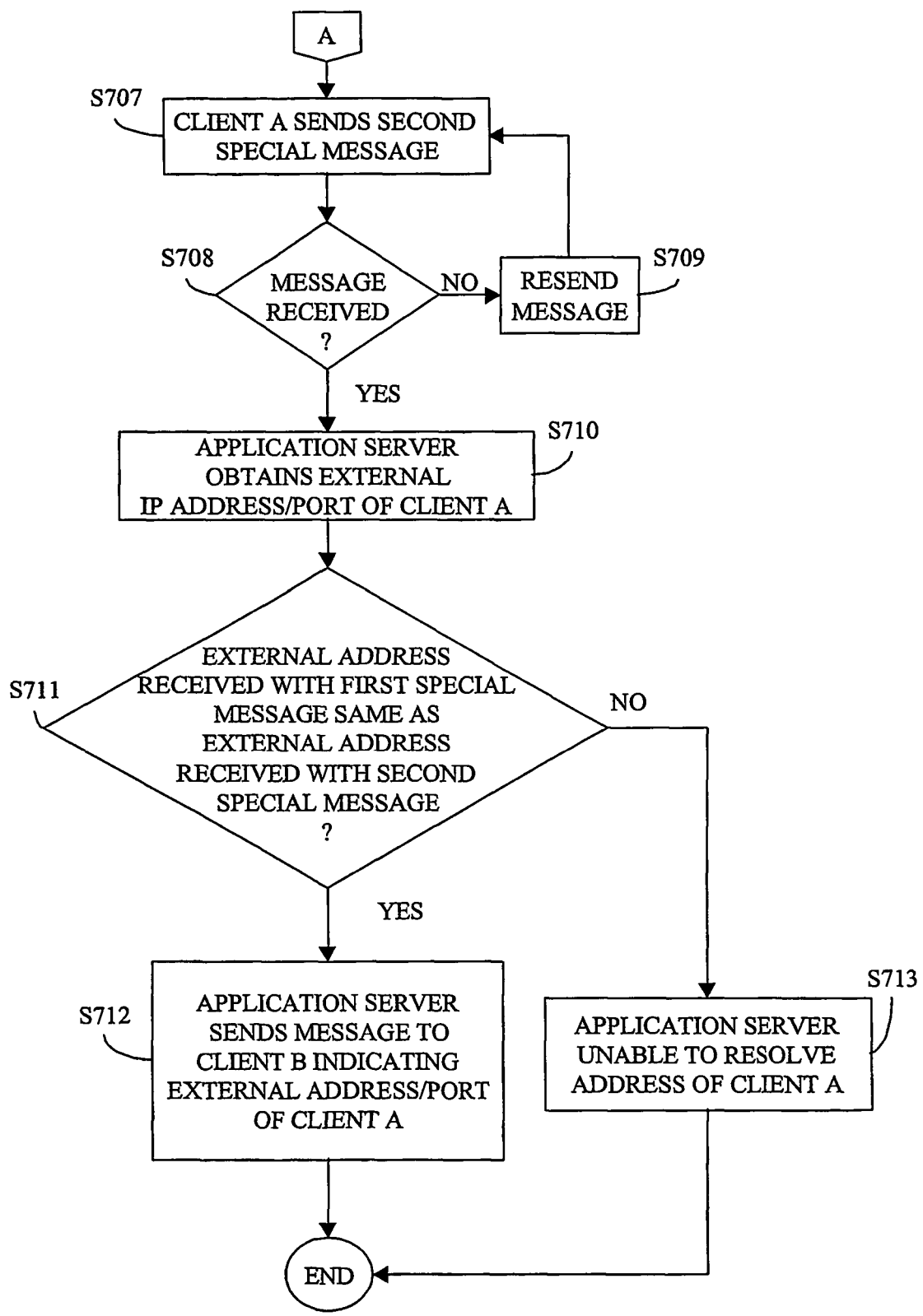
Figure 7C:
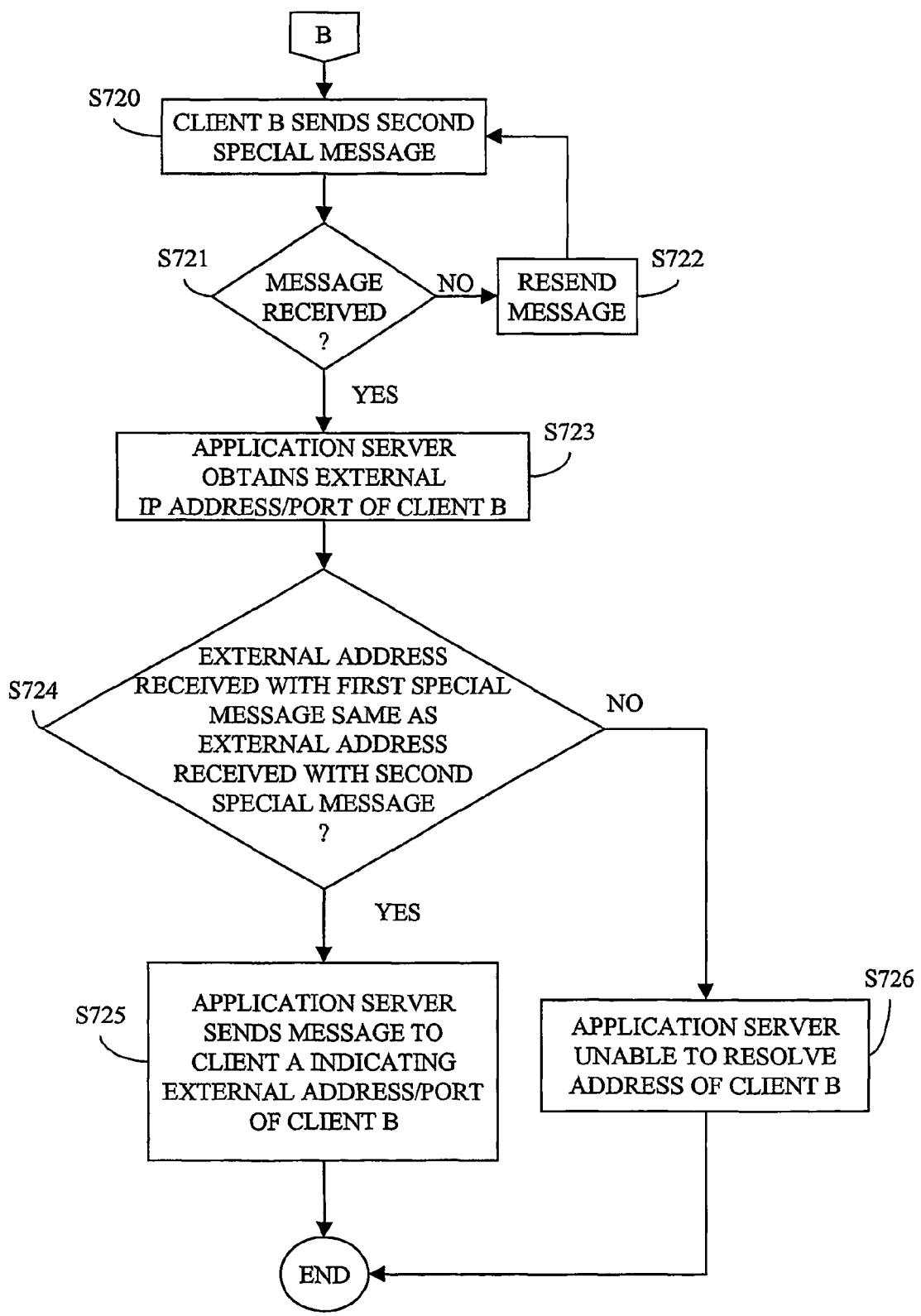

FIGS. 7A-7C are a flow diagram describing a process through which case 2 address resolution is accomplished according to one embodiment of the present invention. As shown in FIGS. 7A-7C, the application server 105 communicates with client A 101 and client B 103 in parallel so that address resolution in both directions may be accomplished. The process will be described herein in the context of steps S701-S713. Steps S701-S713 correspond to the processing performed between the application server 105 and client A 101. As discussed above, steps S714-S726, through which the application server 105 coordinates with client B 103, are processed in parallel with steps S701-S713.

The process begins at step S701 where the application server 105 sends a message to client A 101 behind NAT A 602 telling client A 101 to begin sending a first special message to a first address and port of the application server 105 that is not behind a NAT. The process then proceeds to step S702 where client A 101 sends a first special message to the address and port identified by the application server 105. The process then proceeds to step S703 where the application server 105 determines whether the first special message has been received by the application server 105 from client A 101. If the first special message has not been received by the application server 105 (i.e., "No" at step S703), the process proceeds to step S704 where client A 101 continues to resend the first special message at step S702. If, on the other hand, the first special message has been received by the application server 105 from client A 101 (i.e., "Yes" at step S703), the process proceeds to step S705 where the application server 105 obtains the external address and port of client A 101 from the message header of the first special message, which will correspond to the public address 603 of NAT A 602 used to send the first special message.

The process then proceeds to step S706 where the application server 105 sends a message to client A 101 to begin sending a second special message to a second address and port of the application server 105 that is not behind a NAT. The second address and port are different from the address and port specified for the first special message. The process then proceeds to step S707 where client A 101 sends the second special message to the second address and port of the application server 105. The process then proceeds to step S708 where it is determined whether the second special message has been received by the application server 105. If it is determined that the second special message has not been received by the application server 105 (i.e., "No" at step S708), the process proceeds to step S709 wherein client A 101 continues to resend the second special message to the application server 105 until it is received. If it is determined that the application server 105 has received the second special message (i.e., "Yes" at step S708), the process proceeds to step S710 where the application server 105 obtains the external address and port of client A 101 from the message header of the second special message, which will correspond to the public address 603 of NAT A 602 used to send the second special message.

The process then proceeds to step S711 where the application server 105 determines whether the external address and port received with the first special message (i.e., extracted from the message header of the first special message) from client A 101 is the same external address and port as that received with the second special message (i.e., extracted from the message header of the second special message) sent by client A 101. This check is performed by the application server 105 in order to determine whether the NAT A 602 is translating addresses based on the destination of the messages as sent by client A 101. In one embodiment of the present invention, when the application server 105 determines that the external address and port of client A 101 does not change based on the destination of the message, the application server 105 assumes that when client A 101 sends messages to client B 103, that the same external address and port (i.e., the same external address and port as was used to send the first special message and the second special message) will be used during the communication session.

If it is determined that the external address and port received with the first special message is the same as the external address and port received with the second special message (i.e., "Yes" at step S711), the process proceeds to step S712 where the application server 105 sends a message to client B 103 indicating the external address and port of client A 101 (i.e., the same external address and port through which the first special message and the second special message were sent) through which communication from client B 103 to client A 101 may be achieved. Once this message has been sent from the application server 105 to client B 103, the process ends.

If, on the other hand, it is determined by the application server 105 that the external address and port received with the first special message (i.e., extracted from the message header of the first special message) is not the same as the external address and port received with the second special message (i.e., extracted from the message header of the second special message), (i.e., "No" at step S711), the process proceeds to step S713 where it is determined that the application server 105 is unable to resolve an external address and port of client A 101 for use by client B 103. Once this determination is made at step S713 the process ends, and a communication session between client A 101 and client B 103 is not attempted.

As discussed above, the process described in the context of FIGS. 7A and 7B with respect to the coordination between the application server 105 and client A 101, is performed in parallel between the application server 105 and client B 103, and is described in the context of FIGS. 7A and 7C.

Figure 8:
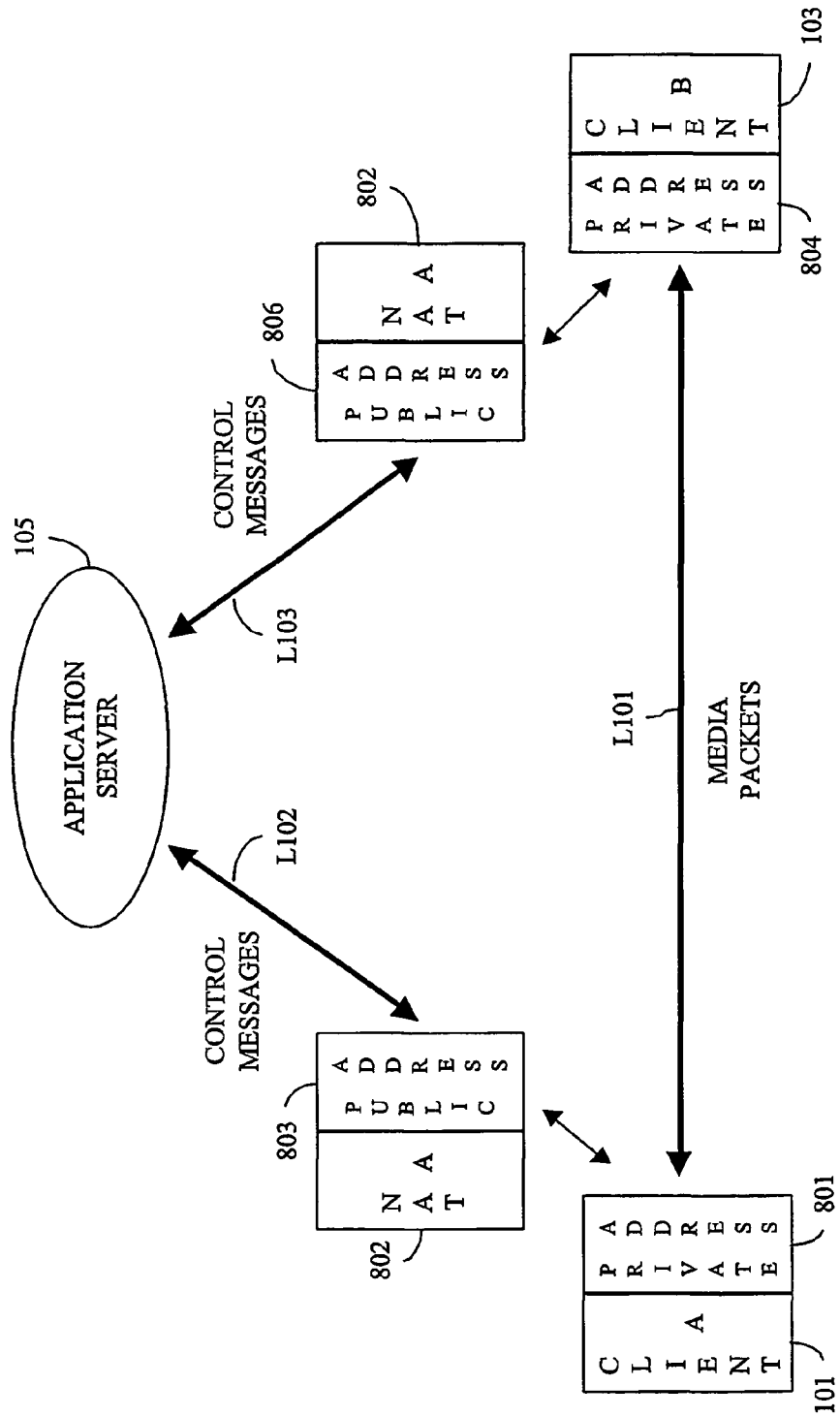
FIG. 8 is a block diagram illustrating a scenario in which both nodes of a session are behind the same NAT.

FIG. 8 is a block diagram of a system illustrating a scenario described in the context of flow diagram FIG. 3 as one in which case 3 address resolution applies. As shown in FIG. 8, client A 101 is behind NAT A802, and client B 103 is also behind NAT A805. In this example, the private address 801 of client A 101 is accessible to client B 103, and, the private address 804 of client B 103 is accessible to client A 101.

Figure 9:
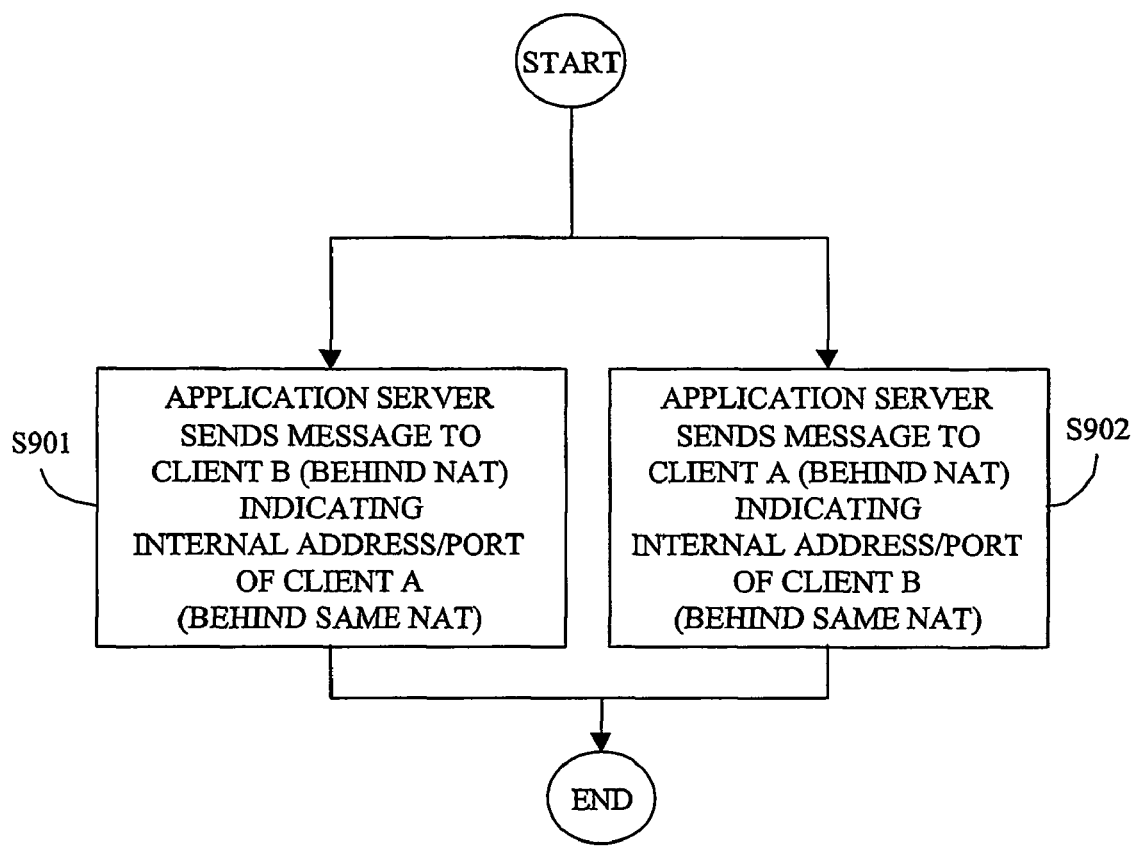
FIG. 9 is a flow diagram illustrating a process through which address resolution is performed in a scenario such as that illustrated in FIG. 8 according to one embodiment of the present invention.

FIG. 9 is a flow diagram describing a process through which case 3 address resolution is accomplished according to one embodiment of the present invention. As shown in FIG. 9, the process begins at step S901 where the application server 105 sends a message to client B 103 behind NAT A 802 indicating the private address 801 of client A 101 that is behind the same NAT. In parallel with step S901, is step S902 where the application server 105 sends a message to client A 101 behind NAT A 802 indicating the private address 804 of client B 103, that is also behind NAT A802. Once these two private addresses have been exchanged via the application server 105, the process ends. In this situation, client A 101 and client B 103 communicate via their private network without going through NAT A 802, thereby alleviating the need for address resolution.

In each of the scenarios described above, the address resolution is controlled by a third party. There are several advantages to this approach, as recognized by the inventors of the present invention. For example, in one embodiment of the present invention, the application server 105 controls the transfer of a call without the need to re-invoke the address resolution protocol described above. In this embodiment, the application server 105 retains the address resolution information. When a transfer of a call is to be performed, the application server 105 provides the new client with the address resolution information required for communicating with the client remaining from the original call, without the need to invoke the protocol again.

A security advantage that is realized by performing address resolution through a third party, as recognized by the present inventors, is that it becomes more difficult to "steal" a media session as compared to an approach where the clients simply send packets back to where they came from. By using the application server 105 to determine explicit IP addresses and ports for the clients to communicate through, the risk of theft is lessened.

Figure 10:
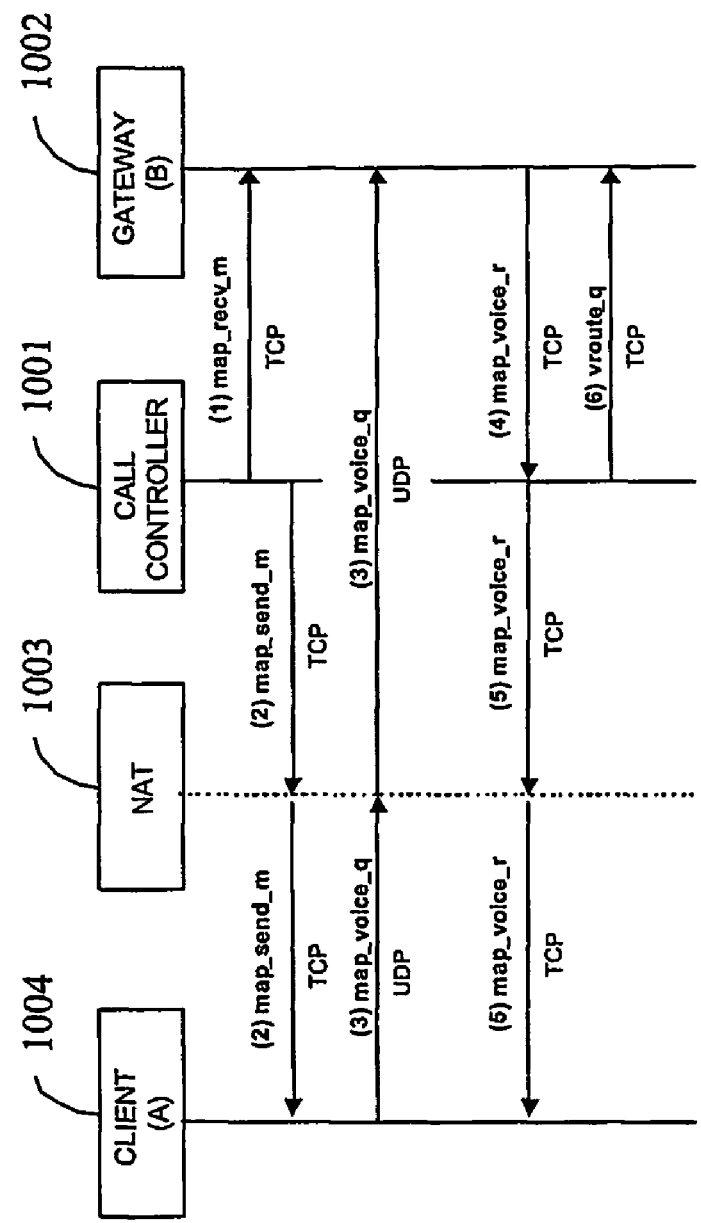
FIG. 10 illustrates a calling sequence for performing address resolution in a scenario such as that illustrated in FIG. 4 for an Internet telephony application according to one embodiment of the present invention.
Figure 11:
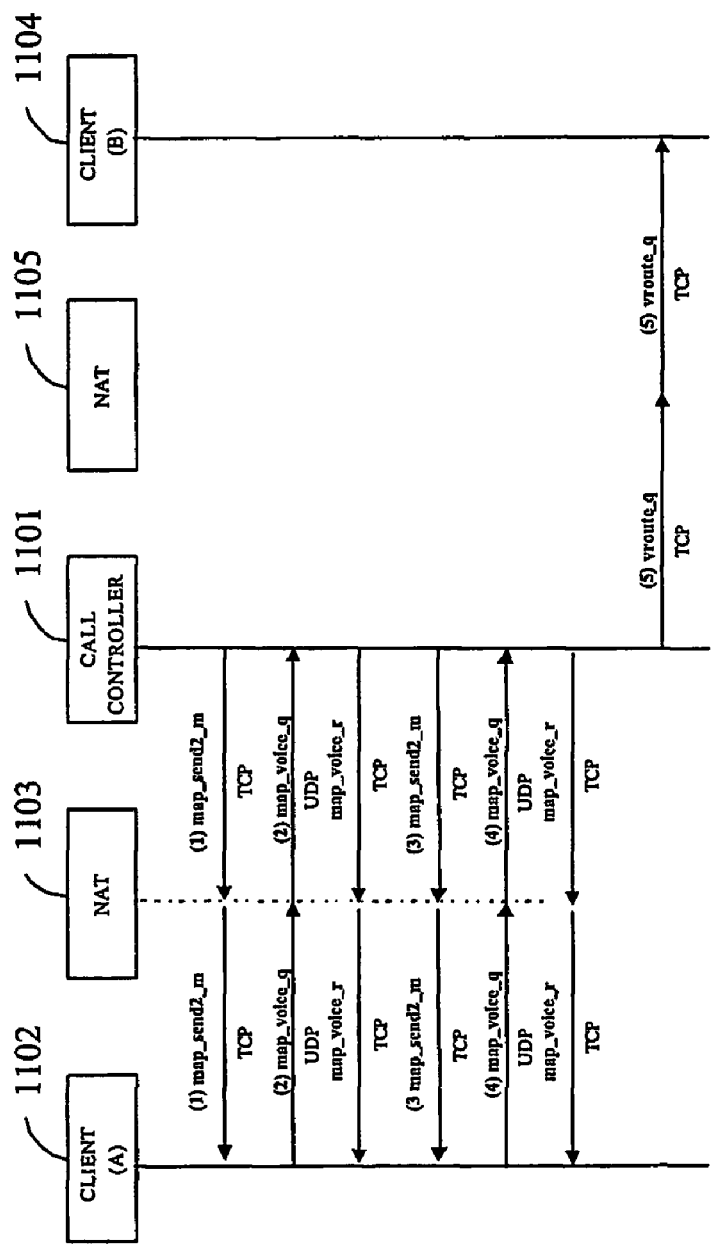
FIG. 11 illustrates a calling sequence for performing address resolution in a scenario such as that illustrated in FIG. 6 for an Internet telephony application according to one embodiment of the present invention.

FIGS. 10 and 11 illustrate one exemplary implementation of a protocol for performing address resolution according to one embodiment of the present invention. This embodiment is described in the context of a voice over IP application. Table 1, below, includes the various message formats and their corresponding descriptions for implementing NAT address resolution in this exemplary application.

TABLE 1

Message Formats Used in an Exemplary Embodiment

| | |
|---|---|
| mapsend_m | <id> <ipaddr> <udpport><br>This TCP message is sent from call controller to NAT client/gateway to initiate the mapvoice_[qr] protocol. The client/gateway should send a mapvoice_q UDP message to the gateway/client at the IP address and port specified in the arguments <ipaddr> and <udpport> until a mapvoice_r message is received. Failure to receive a mapvoice_r message after a short period of time should be treated as a timeout and the call should be terminated. The argument <id> is unique identifier that is used in all the messages. |
| mapsend2_m | <id> <ipaddr> <udpport><br>This TCP message is sent from the call controller to NAT client to initiate the mapvoice_[qr] protocol, if the clients are behind different NATs (or RTP headers are being used). If this case, the arguments <ipaddr> and <port> will be an IP address and UDP port that is read by the call controller. This message should be processed the same as mapsend_m except the mapvoice_q messages should be sent repeatedly at a longer interval (about 1 second) so that the call controller is not inundated with messages. |
| maprecv_m | <id><br>This TCP message is sent from call controller to non-NAT client/gateway to initiate the mapvoice_[qr] protocol. The client/gateway should expect to receive a mapvoice_q message with a matching <id> argument. |
| mapvoice_q | <id><br>This UDP message sent from NAT client/gateway to non-NAT client/gateway to map voice correctly. Since the client/gateway is expecting binary UDP messages, if the process was initiated with a mapsend_m message, a four-byte header must be inserted before the SOM (^) character. The second byte must be 0x4 to indicate that the packet contains an ASCII message. The other bytes in the header can be arbitrary values. |
| mapvoice_r | <id> <ipaddr> <udpport><br>This TCP message is sent from non-NAT client/gateway to the call controller. The call controller forwards this message to the NAT client/gateway. The <ipaddr> and <udpport> arguments are the address/port where the mapvoice_q message was received (i.e. the external address of the NAT client). This message terminates the UDP address resolution protocol. |
| vroute_q | <arg1> <arg2> <arg3> <sendaddr> <sendport> <recvaddr> <recvport> <parm><br>This message is sent when the call is transferred to a different gateway server (e.g., for conferencing or leaving voice mail). The fields <sendaddr> and <sendport> are the IP address and UDP port where the voice data should be sent. If <sendport> is 0, the client should stop sending voice packets until a new port is provided. The fields <recvaddr> and <recvport> are the IP address and UDP port from where the voice data will be received. If <recvport> is 0, the client should discard any voice packets until a new port is provided. The fields <arg1>, <arg2>, and <arg3> are not used by the client and should be returned in the response vroute_r message. The field <parm> is provided for future use. |
| vroute_r | <arg1> <arg2> <arg3> <status> <parm><br>This message is sent by the client in response to receipt of a vroute_q message. The fields <arg1>, <arg2>, and <arg3> are copied from the vroute_q message. The status should be 0 to acknowledge acceptance of the request, and 1 if the request is rejected. The <parm> field is for future use. |

The inventors of the present invention have recognized that it would be advantageous if an address resolution protocol was protocol independent. Accordingly, the address resolution protocol described herein can be used with any protocol so long as the clients are able to distinguish address resolution packets from media packets.

FIG. 10 illustrates an exemplary calling sequence for implementing a case 1 NAT address resolution for a voice-over-IP application according to one embodiment of the present invention. As shown in FIG. 10, client A 1004 is behind a NAT 1003, while client B (gateway) 1002 is not behind NAT. The call controller 1001 corresponds to the application server 105. The example shown in FIG. 10 corresponds to a PC-to-phone situation where client A 1004 is a PC behind a NAT 1003, and client B 1002 is referred to as a gateway connected to the phone network. For PC-to-phone calls, the gateway is not behind a NAT, and therefore, only case 1 address resolution, as described above, is applicable. If both clients are PCs (i.e., PC-to-PC calls), then all of the cases (i.e., case 1, case 2, and case 3) described above could apply.

Prior to address resolution being performed, the call controller 1001 determines if the calling client is behind a NAT device. The call controller 1001 uses the IP addresses provided in initiation messages sent to the call controller 1001 by the clients 1004, 1002, as well as the IP addresses included in the message headers of those initiation messages to determine if one or more clients are behind a NAT. Once it is determined that a client (e.g., client A 1004) is behind a NAT (e.g., NAT 1003), as shown in FIG. 10, the call controller 1001 sends a maprecv_m message to client B 1002 telling client B 1002 to expect a mapvoice_q message having an identifier that matches an identifier included in the maprecv_m message. Next, the call controller 1001 sends a mapsend_m message to client A 1004 via the NAT 1003 telling client A 1004 to start sending mapvoice_q messages to the IP address and port included in the mapsend_m message. In response, client A 1004 begins sending mapvoice_q messages to client B 1002. Once the mapvoice_q message is received by client B 1002, client B 1002 sends a mapvoice_r message to the call controller 1001 including the IP address and port from the header of mapvoice_q message. The IP address and port will correspond to the external address of the NAT 1003. The call controller 1001 forwards this mapvoice_r message to client A 1004 through the NAT 1003. Finally, the call controller 1001 will send the external IP address and port of client A 1004 to client B 1002 via a vroute_q message. The vroute_q message indicates which IP address and port through which client B 1002 should communicate to client A 1004. In one embodiment of the present invention, the vroute_q message received by client B 1002 is acknowledged by responding with a vroute_r message (not shown in FIG. 10).

FIG. 11 illustrates a sequence of messages sent in implementing a case 2 address resolution in a voice-over-IP application where client A 1102 and client B 1104 are behind different NATs according to one embodiment of the present invention. As shown in FIG. 11, the call controller 1101 sends a mapsend2_m message to client A 1102 through a first NAT 1103 telling client A 1102 to start sending mapvoice_q messages to a first IP address and port of the call controller 1101. The protocol being described herein in the context of the control between the call controller 1101 and client A 1102 is followed in parallel between the call controller 1101 and client B 1104 through the second NAT 1105. For clarity, the message flow between the call controller 1101 and client B 1104 has not been shown in FIG. 11, and that message traffic will not be described herein.

Next, client A 1102 begins sending mapvoice_q messages to the appropriate IP address and port of the controller 1101. Once the mapvoice_q message is received by the call controller 1101, the call controller 1101 sends a mapvoice_r message to client A 1102 telling client A 1102 to stop sending mapvoice_q messages. Next, the call controller 1101 sends a mapsend2_m message to client A telling client A to send mapvoice_q messages to a second IP address and port of the call controller 1101. Once client A 1102 receives the mapsend2_m message, client A 1102 begins sending mapvoice_q messages to the call controller 1101. Again, once the call controller 1101 receives the mapvoice_q message from client A 1102, the call controller 1101 sends a mapvoice_r message to client A 1102 telling it to stop sending mapvoice_q messages. Once the call controller 1101 has received the two mapvoice_q messages from client A on different IP address and ports, the call controller 1101 can make a determination as to whether the first NAT 1103 translates addresses based on the destination of the message. If it is determined that the first NAT 1103 does not change the address translation based on the destination of the message, the call controller 1101 assumes that the external IP address and port of client A will be the same external IP address and port when communicating with client B 1104 as it was when communicating with the call controller 1101. Accordingly, the call controller 1101 will then send a vroute_q message to client B 1104 indicating the external IP address and port of client A 1102 through which client B 1104 should communicate with client A 1102. In one embodiment of the present invention, the vroute_q message received by client B 1104 is acknowledged by responding with a vroute_r message (not shown in FIG. 11). Again, as discussed above, in a case 2 scenario such as that shown in FIG. 11, the processing performed for client A 1102 by the call controller 1101 is performed in parallel for client B 1104 by the call controller 1101 so that appropriate IP address and port information may be exchanged between the two clients.

Figure 12:
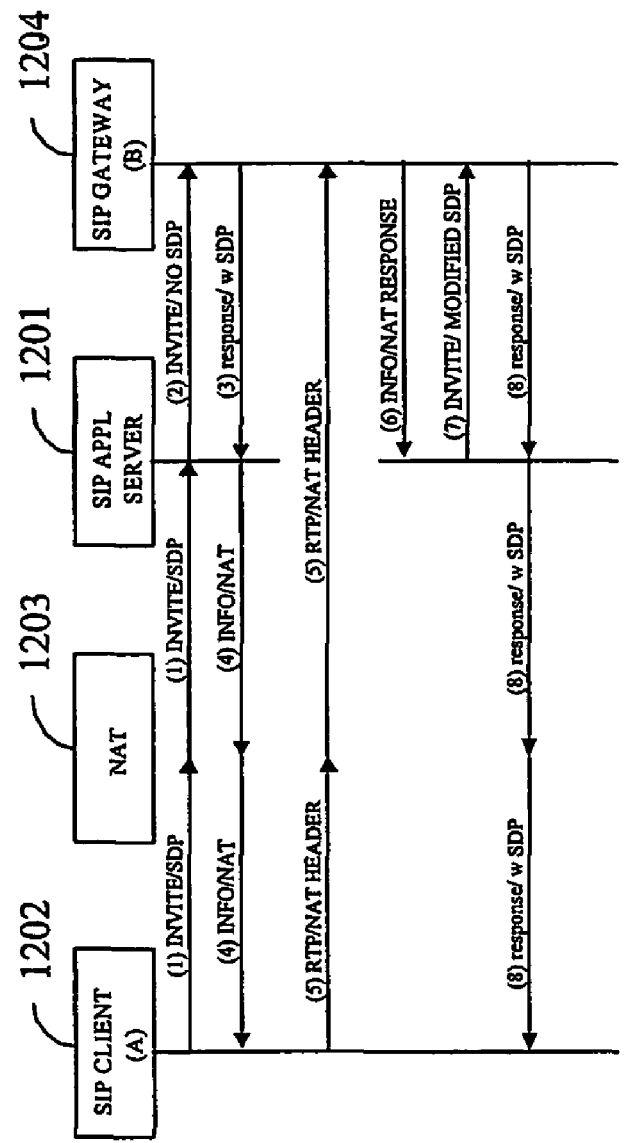
FIG. 12 illustrates a calling sequence for performing address resolution in a scenario such as that illustrated in FIG. 4 for an application complying with the session initiation protocol according to one embodiment of the present invention.

FIG. 12 is a diagram showing a calling sequence for performing NAT address resolution in a session initiation protocol (SIP) application according to one embodiment of the present invention. SIP is used to establish, change, and teardown calls between two or more endpoints in an IP-based network. SIP is a textual client-server protocol, with requests issued by the client and responses returned by the server. SIP is similar to the hypertext transfer protocol (HTTP) with respect to its response code architecture, message headers, and its overall operation. SIP is used for IP telephony functions by mapping each function to one or more transactions. An SIP transaction consists of a single request issued by a client, and one or more responses returned by one or more servers. Each SIP request is an attempt to invoke a method on the server. RFC 2543 describes six SIP methods, and is available through the IETF website (www.ietf.org). The entire contents of RFC 2543 is incorporated herein by reference. The most basic of these methods is the INVITE method, which is used to initiate a call between a client and a server.

SIP incorporates the following protocols: RSVP for reserving network resources as described in RFC 2205; the real-time transport protocol RTP) for transporting real-time data and providing quality of service (QOS) feedback as described in RFC 1889; the real-time streaming protocol (RTSP) for controlling delivery of streaming media as described in RFC 2326; the session announcement protocol (SAP) for advertising multimedia sessions via multicast as described in RFC 2974; and the session description protocol (SDP) for describing multimedia sessions as described in RFC 2327, the entire contents of each of these five RFCs being incorporated herein by reference.

As shown in FIG. 12, the SIP application server 1201 is responsible for controlling the NAT address resolution. The SIP application server 1201 corresponds to the application server and the call controller described above. The SIP application server 1201 determines which SIP clients are behind a NAT in order to determine the proper address resolution to perform. In the example shown in FIG. 12, SIP client A 1202 is behind a NAT 1203, whereas SIP GATEWAY B 1204 is not behind a NAT. SIP client A 1202 must provide its internal IP address from which it is sending the SIP message in order for the SIP application server 1201 to correctly determine whether the SIP client is behind a NAT.

In one embodiment of the present invention, SIP client A 1202 provides its internal IP address by placing it in a new header (e.g., a "Via-From" header similar to the "Via" header) in the SIP INVITE message. Since SIP messages can pass through many other servers before reaching their destination, any SIP Proxy along the path should also insert a "Via-Receive" header including the IP address from which the message was received in case that SIP Proxy server is behind a NAT.

Alternately, SIP client A 1202 could insert another new header (e.g., "NAT-Protocol: true") in order to force an invocation of the NAT resolution protocol if SIP client A 1202 knows it is behind a NAT through, for example, an external method such as provisioning. These exemplary methods do not require that changes be made to existing SIP Proxy servers in order to support the new headers (e.g., a "Via-From" header and a "Via-Receive" header) since SIP Proxy servers are required to pass on all headers.

The protocol begins by SIP client A 1202 sending an INVITE/SDP request to the SIP application server 1201. The SIP application server determines the location of SIP GATEWAY B 1204, for example, through the use of a location server, and forwards the INVITE request to SIP GATEWAY B 1204. SIP GATEWAY B 1204 responds to the SIP application server 1201 with a message including information as to whether the SIP GATEWAY B 1204 can support the NAT protocol on the RTP stream. If SIP GATEWAY B 1204 is unable to support the NAT protocol on the RTP stream, the SIP application server 1201 will implement NAT address resolution according to a case 2 scenario, described below in the context of FIG. 13.

After SIP GATEWAY B 1204 has responded to the SIP application server 1201, the SIP application server 1201 sends an INFO message with NAT content to SIP client A 1202. In one embodiment of the present invention, the SDP parameters are used to set a dynamic NAT payload type and an IP address and port indicating where the RTP message is to be sent. SIP client A 1202 then sends an RTP message with the NAT payload type to SIP GATEWAY B 1204, for example, every one second, until an INFO response message is received from the SIP application server 1201. In one embodiment of the present invention, a failure to receive an INFO message after a short period of time is treated as a timeout, and the call is terminated. Once SIP GATEWAY B 1204 receives the RTP message, SIP GATEWAY B 1204 sends an INFO/NAT response message to the SIP application server 1201. The INFO/NAT message contains the external IP address and UDP port of SIP client A 1202 as received in the RTP message. The SIP application server 1201 forwards this message to SIP client A, causing SIP client A, to stop sending the special RIP packets to SIP GATEWAY B 1204.

The SIP application server 1201 then sends a reINVITE message to SIP GATEWAY B 1204 containing the external IP address and UDP port to which it should send its voice data in the modified SDP content. Next, the SIP GATEWAY B 1204 sends another response to the SIP application server 1201 with SDP content. The SIP application server 1201 will pass this message onto SIP client A 1202.

Figure 13:
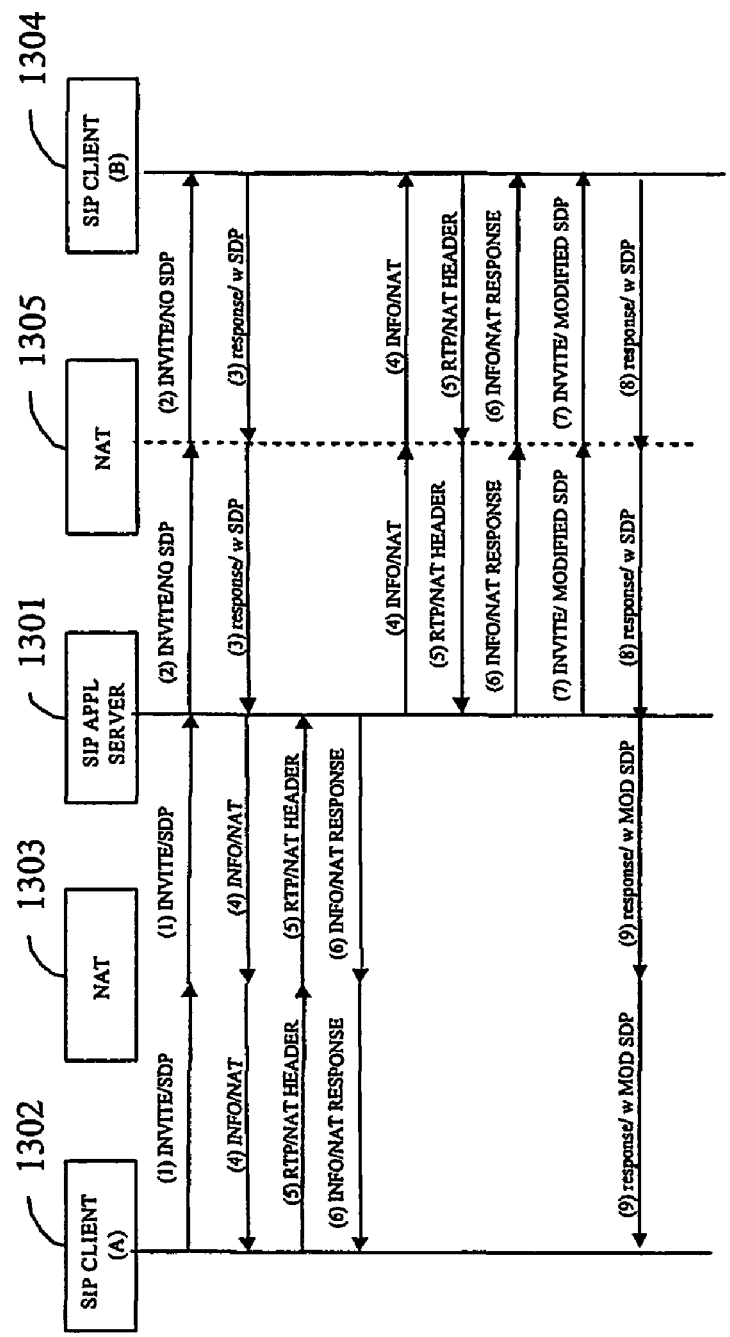
FIG. 13 illustrates a calling sequence for performing address resolution in a scenario such as that illustrated in FIG. 6 for an application complying with the session initiation protocol according to one embodiment of the present invention.

FIG. 13 is a diagram illustrating a calling sequence for performing NAT address resolution in a SIP protocol application where both SIP clients are behind different NATs (i.e., case 2 address resolution) according to one embodiment of the present invention. As shown in FIG. 13, the protocol begins with SIP client A 1302 sending an INVITE request to the SIP application server 1301. The SIP application server 1301 then determines the location of SIP client B 1304, for example, through the use of a location server, and forwards the received INVITE request to SIP client B 1304, stripping off any SDP content from the request. Next, SIP client B 1304 sends a response to the SIP application server 1301 including SDP content. The SIP application server 1301 will pass that message on. Next, the SIP application server 1301 sends an INFO message with NAT content to both SIP client A 1302 and SIP client B 1304.

Both SIP client A 1302 and SIP client B 1304 will send an RTP message to the SIP application server 1301, for example, every one second, until an INFO/NAT response message is received from the SIP application server 1301. In one embodiment of the present invention, if either SIP client A 1302 or SIP client B 1304 do not receive an INFO message after a short period of time, it is treated as a timeout, and the call is terminated.

The SIP application server 1301 sends an INFO/NAT response message to both SIP client A 1302 and SIP client B 1304. The INFO/NAT response message will include the external IP address and UDP port of SIP client A 1302 and SIP client B 1304 respectively, as received in the corresponding RTP messages. Once the INFO/NAT response message is received by SIP client A 1302 and SIP client B 1304, the clients will stop sending the special RTP packets to the SIP application server 1301.

The SIP application server 1301 will then send a reINVITE message to SIP client B 1304 including the external IP address and UDP port to which it should send its voice data and the modified SDP content section. SIP client B 1304 then sends another response to the SIP application server 1301 with SDP content. The SIP application server 1301 modifies the IP address and UDP port contents of the SDP content section and passes it on to SIP client A 1302.

In one embodiment of the present invention, if it were determined in an SIP application that both client A and client B were behind the same NAT, the SIP application server would simply send the INVITE message received from client A to client B without modification, since client A would have naturally provided their internal IP address in the SDP content section.

Figure 14:
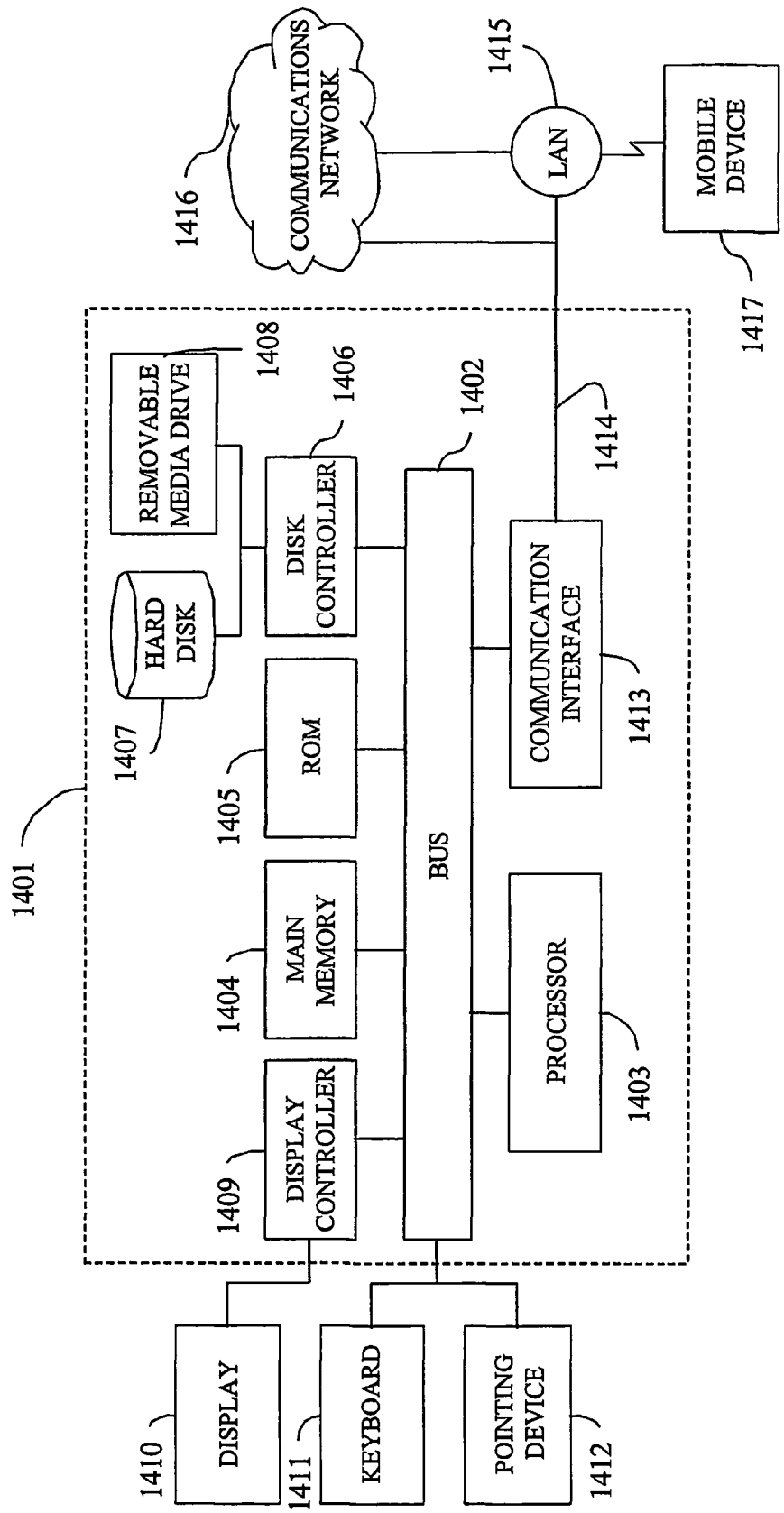
FIG. 14 is an exemplary computer system programmed to perform one or more of the special purpose functions of the present invention.

FIG. 14 illustrates a computer system 1401 upon which an embodiment of the present invention may be implemented. The computer system 1401 includes a bus 1402 or other communication mechanism for communicating information, and a processor 1403 coupled with the bus 1402 for processing the information. The computer system 1401 also includes a main memory 1404, such as a random access memory (RAM) or other dynamic storage device (e.g., dynamic RAM (DRAM), static RAM (SRAM), and synchronous DRAM (SDRAM)), coupled to the bus 1402 for storing information and instructions to be executed by processor 1403. In addition, the main memory 1404 may be used for storing temporary variables or other intermediate information during the execution of instructions by the processor 1403. The computer system 1401 further includes a read only memory (ROM) 1405 or other static storage device (e.g., programmable ROM (PROM), erasable PROM (EPROM), and electrically erasable PROM (EEPROM)) coupled to the bus 1402 for storing static information and instructions for the processor 1403.

The computer system 1401 also includes a disk controller 1406 coupled to the bus 1402 to control one or more storage devices for storing information and instructions, such as a magnetic hard disk 1407, and a removable media drive 1408 (e.g., floppy disk drive, read-only compact disc drive, read/write compact disc drive, compact disc jukebox, tape drive, and removable magneto-optical drive). The storage devices may be added to the computer system 1401 using an appropriate device interface (e.g., small computer system interface (SCSI), integrated device electronics (IDE), enhanced-IDE (E-IDE), direct memory access (DMA), or ultra-DMA).

The computer system 1401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1401 may also include a display controller 1409 coupled to the bus 1402 to control a display 1410, such as a cathode ray tube (CRT), for displaying information to a computer user. The computer system includes input devices, such as a keyboard 1411 and a pointing device 1412, for interacting with a computer user and providing information to the processor 1403. The pointing device 1412, for example, may be a mouse, a trackball, or a pointing stick for communicating direction information and command selections to the processor 1403 and for controlling cursor movement on the display 1410. In addition, a printer may provide printed listings of data stored and/or generated by the computer system 1401.

The computer system 1401 performs a portion or all of the processing steps of the invention in response to the processor 1403 executing one or more sequences of one or more instructions contained in a memory, such as the main memory 1404. Such instructions may be read into the main memory 1404 from another computer readable medium, such as a hard disk 1407 or a removable media drive 1408. One or more processors in a multi-processing arrangement may also be employed to execute the sequences of instructions contained in main memory 1404. In alternative embodiments, hard-wired circuitry may be used in place of or in combination with software instructions. Thus, embodiments are not limited to any specific combination of hardware circuitry and software.

As stated above, the computer system 1401 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1401, for driving a device or devices for implementing the invention, and for enabling the computer system 1401 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1403 for execution. A computer readable medium may take many forms, including but not limited to, non-volatile media, volatile media, and transmission media. Non-volatile media includes, for example, optical, magnetic disks, and magneto-optical disks, such as the hard disk 1407 or the removable media drive 1408. Volatile media includes dynamic memory, such as the main memory 1404. Transmission media includes coaxial cables, copper wire and fiber optics, including the wires that make up the bus 1402. Transmission media also may also take the form of acoustic or light waves, such as those generated during radio wave and infrared data communications.

Various forms of computer readable media may be involved in carrying out one or more sequences of one or more instructions to processor 1403 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1401 may receive the data on the telephone line and use an infrared transmitter to convert the data to an infrared signal. An infrared detector coupled to the bus 1402 can receive the data carried in the infrared signal and place the data on the bus 1402. The bus 1402 carries the data to the main memory 1404, from which the processor 1403 retrieves and executes the instructions. The instructions received by the main memory 1404 may optionally be stored on storage device 1407 or 1408 either before or after execution by processor 1403.

The computer system 1401 also includes a communication interface 1413 coupled to the bus 1402. The communication interface 1413 provides a two-way data communication coupling to a network link 1414 that is connected to, for example, a local area network (LAN) 1415, or to another communications network 1416 such as the Internet. For example, the communication interface 1413 may be a network interface card to attach to any packet switched LAN. As another example, the communication interface 1413 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1413 sends and receives electrical, electromagnetic or optical signals that carry digital data streams representing various types of information.

The network link 1414 typically provides data communication through one or more networks to other data devices.

For example, the network link 1414 may provide a connection to another computer through a local network 1415 (e.g., a LAN) or through equipment operated by a service provider, which provides communication services through a communications network 1416. In preferred embodiments, the local network 1414 and the communications network 1416 preferably use electrical, electromagnetic, or optical signals that carry digital data streams. The signals through the various networks and the signals on the network link 1414 and through the communication interface 1413, which carry the digital data to and from the computer system 1401, are exemplary forms of carrier waves transporting the information. The computer system 1401 can transmit and receive data, including program code, through the network(s) 1415 and 1416, the network link 1414 and the communication interface 1413. Moreover, the network link 1414 may provide a connection through a LAN 1415 to a mobile device 1417 such as a personal digital assistant (PDA) laptop computer, or cellular telephone. The LAN communications network 1415 and the communications network 1416 both use electrical, electromagnetic or optical signals that carry digital data streams. The signals through the various networks and the signals on the network link 1414 and through the communication interface 1413, which carry the digital data to and from the system 1401, are exemplary forms of carrier waves transporting the information. The processor system 1401 can transmit notifications and receive data, including program code, through the network(s), the network link 1414 and the communication interface 1413.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer implemented method for performing address resolution, comprising the steps of:
    sending a first initiate message by a controller to a first node, the first initiate message telling the first node to send a first special message to the controller at a first predetermined address, the first node being behind a first network address translator;
    sending a second initiate message by the controller to a second node, the second initiate message telling the second node to send a second special message to the controller at a second predetermined address, the second node being behind a second network address translator;
    sending the first special message by the first node to the controller at the first predetermined address;
    sending the second special message by the second node to the controller at the second predetermined address;
    determining by the controller a first external address of the first node based on information received by the controller with the first special message;
    determining by the controller a second external address of the second node based on information received by the controller with the second special message;
    sending a third initiate message by the controller to the first node, the third initiate message telling the first node to send another first special message to the controller at a third predetermined address;
    sending a fourth initiate message by the controller to the second node, the fourth initiate message telling the second node to send another second special message to the controller at a fourth predetermined address;
    sending the another first special message by the first node to the controller at the third predetermined address;
    sending the another second special message by the second node to the controller at the fourth predetermined address;
    determining by the controller another first external address of the first node based on information received by the controller with the another first special message;
    determining by the controller another second external address of the second node based on information received by the controller with the another second special message;
    determining by the controller that none of the first network address translator and the second network address translator base an address translation on a destination of a message sent;
    sending a route message by the controller to the first node, the route message including a second communication address of the second node, the second communication address being the second external address of the second node; and
    sending another route message by the controller to the second node, the another route message including a first communication address of the first node, the first communication address being the first external address of the first node;
    wherein the first external address of the first node, the another first external address of the first node, the second external address of the second node and the another second external address of the second node comprise an Internet protocol address and a user datagram protocol port.

2. The method of claim 1, further comprising the step of: determining by the controller that the first node is behind a first network address translator, and that the second node is behind a second network address translator.

3. The method of claim 2, wherein the determining step comprises:
    receiving by the controller a first address message from the first node, the first address message including a first internal address corresponding to the first node;
    receiving by the controller a second address message from the second node, the second address message including a second internal address corresponding to the second node;
    comparing by the controller the first internal address with a first source address included with the first address message, and the second internal address with a second source address included with the second address message; and
    determining by the controller based on a result of the comparing step that the first node is behind a first network address translator, and that the second node is behind a second network address translator.

4. The method of claim 1, further comprising the steps of:
    sending a first acknowledgement message by the controller to the first node after receiving the first special message;
    sending a second acknowledgement message by the controller to the second node after receiving the second special message;
    ending a third acknowledgement message by the controller to the first node after receiving the another first special message;
    sending a fourth acknowledgement message by the controller to the second node after receiving the another second special message, wherein the sending the first special message step comprises repeatedly sending the first special message by the first node until the first node receives the first acknowledgement message, the sending the second special message step comprises repeatedly sending the second special message by the second node until the second node receives the second acknowledgement message, the sending the another first special message step comprises repeatedly sending the another first special message by the first node until the first node receives the third acknowledgement message, and the sending the another second special message step comprises repeatedly sending the another second special message by the second node until the second node receives the fourth acknowledgement message.

5. The method of claim 4, wherein the initiate messages, the special messages, the route messages, and the acknowledgement messages comprise Internet protocol messages.

6. The method of claim 5, wherein: the initiate messages, the route messages, and the acknowledgement messages comprise transmission control protocol/Internet protocol messages, and the special messages comprise a user datagram protocol/Internet protocol message.

7. The method of claim 1, wherein the initiate messages, the special messages, and the route messages comprise Internet protocol messages.

8. The method of claim 7, wherein: the initiate messages and the route messages comprise transmission control protocol/Internet protocol messages, and the special messages comprise a user datagram protocol/Internet protocol message.

9. The method of claim 1, wherein the controller is a process independent of the first node and the second node.

10. A computer implemented method for performing address resolution, comprising the steps of:

determining by a controller that a first node is behind a first network address translator and a second node is behind a second network address translator; and performing address resolution by the controller, the performing step comprising:

sending a first initiate message by the controller to the first node, the first initiate message telling the first node to send a first special message to the controller at a first predetermined address, sending a second initiate message by the controller to the second node, the second initiate message telling the second node to send a second special message to the controller at a second predetermined address, sending the first special message by the first node to the controller at the first predetermined address, sending the second special message by the second node to the controller at the second predetermined address, determining by the controller a first external address of the first node based on information received by the controller with the first special message, determining by the controller a second external address of the second node based on information received by the controller with the second special message, sending a third initiate message by the controller to the first node, the third initiate message telling the first node to send another first special message to the controller at a third predetermined address, sending a fourth initiate message by the controller to the second node, the fourth initiate message telling the second node to send another second special message to the controller at a fourth predetermined address, sending the another first special message by the first node to the controller at the third predetermined address, sending the another second special message by the second node to the controller at the fourth predetermined address, determining by the controller another first external address of the first node based on information received by the controller with the another first special message, determining by the controller another second external address of the second node based on information received by the controller with the another second special message, determining by the controller that none of the first network address translator and the second network address translator base an address translation on a destination of a message sent, sending a route message by the controller to the first node, the route message including a second communication address of the second node, the second communication address being the second external address of the second node, and sending another route message by the controller to the second node, the another route message including a first communication address of the first node, the first communication address being the first external address of the first node, wherein the first external address of the first node, the another first external address of the first node, the second external address of the second node and the another second external address of the second node comprise an Internet protocol address and a user datagram protocol port.

11. A system for performing address resolution, comprising:

means for sending a first initiate message by a controller to a first node, the first initiate message telling the first node to send a first special message to the controller at a first predetermined address, the first node being behind a first network address translator;

means for sending a second initiate message by the controller to a second node, the second initiate message telling the second node to send a second special message to the controller at a second predetermined address, the second node being behind a second network address translator;

means for sending the first special message by the first node to the controller at the first predetermined address;

means for sending the second special message by the second node to the controller at the second predetermined address;

means for determining by the controller a first external address of the first node based on information received by the controller with the first special message;

means for determining by the controller a second external address of the second node based on information received by the controller with the second special message;

means for sending a third initiate message by the controller to the first node, the third initiate message telling the first node to send another first special message to the controller at a third predetermined address;

means for sending a fourth initiate message by the controller to the second node, the fourth initiate message telling the second node to send another second special message to the controller at a fourth predetermined address;

means for sending the another first special message by the first node to the controller at the third predetermined address;

means for sending the another second special message by the second node to the controller at the fourth predetermined address;

means for determining by the controller another first external address of the first node based on information received by the controller with the another first special message;

means for determining by the controller another second external address of the second node based on information received by the controller with the another second special message;

means for determining by the controller that none of the first network address translator and the second network address translator base an address translation on a destination of a message sent;

means for sending a route message by the controller to the first node, the route message including a second communication address of the second node, the second communication address being the second external address of the second node; and means for sending another route message by the controller to the second node, the another route message including a first communication address of the first node, the first communication address being the first external address of the first node;

wherein the first external address of the first node, the another first external address of the first node, the second external address of the second node and the another second external address of the second node comprise an Internet protocol address and a user datagram protocol port.

12. The system of claim 11, further comprising: means for determining by the controller that the first node is behind a first network address translator, and that the second node is behind a second network address translator.

* * * * *